United States Patent
O'Neill

(10) Patent No.: US 7,366,182 B2
(45) Date of Patent: Apr. 29, 2008

(54) METHODS AND APPARATUS FOR EFFICIENT VPN SERVER INTERFACE, ADDRESS ALLOCATION, AND SIGNALING WITH A LOCAL ADDRESSING DOMAIN

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 10/918,262

(22) Filed: Aug. 13, 2004

(65) Prior Publication Data

US 2006/0034297 A1    Feb. 16, 2006

(51) Int. Cl.
*H04L 12/56* (2006.01)

(52) U.S. Cl. .................. 370/395.53; 709/224; 709/225; 726/16

(58) Field of Classification Search ................ 370/254, 370/389, 392, 395.53, 395.5, 395.31, 400, 370/428; 726/15
See application file for complete search history.

(56) References Cited

U.S. PATENT DOCUMENTS

| | | |
|---|---|---|
| 6,445,922 B1 | 9/2002 | Hiller et al. |
| 6,496,505 B2 | 12/2002 | La Porta et al. |
| 6,519,254 B1 | 2/2003 | Chuah et al. |
| 2002/0018456 A1 | 2/2002 | Kakemizu et al. |
| 2002/0026527 A1 | 2/2002 | Das et al. |
| 2002/0101870 A1* | 8/2002 | Chase et al. ............... 370/389 |
| 2002/0191593 A1 | 12/2002 | O'Neill et al. |
| 2003/0137961 A1 | 7/2003 | Tsirtsis et al. |
| 2003/0176188 A1 | 9/2003 | O'Neill |
| 2003/0177396 A1* | 9/2003 | Bartlett et al. .............. 713/201 |
| 2004/0103205 A1* | 5/2004 | Larson et al. ............... 709/229 |
| 2004/0208122 A1* | 10/2004 | McDysan .................. 370/230 |
| 2004/0224681 A1* | 11/2004 | Sjostrand ................... 455/433 |
| 2005/0008017 A1* | 1/2005 | Datta et al. ................ 370/392 |
| 2005/0268084 A1* | 12/2005 | Adams et al. ................. 713/2 |
| 2006/0002409 A1* | 1/2006 | Menon et al. .............. 370/409 |
| 2006/0034209 A1* | 2/2006 | O'Neill ..................... 370/328 |

OTHER PUBLICATIONS

Dynamic external home agent assignment in mobile VPN, Jyn-chen et al, vol. 5, 26, Sep. 2004, 5 pages.*

(Continued)

*Primary Examiner*—Hassan Kizou
*Assistant Examiner*—Mounir Moutaouakil
(74) *Attorney, Agent, or Firm*—Straub & Pokotylo; Michael P. Straub; Ronald P. Straub

(57) ABSTRACT

The present invention relates to communications systems and, more particularly, to methods and apparatus for efficient address delegation and/or assignment and/or signaling in a virtual communications network, e.g., a network supporting virtual private networks (VPNs) and one or more addressing domains. The methods are well suited for systems such as mobile communications systems, where the number of mobile nodes in each of a plurality of visited domains can change on a relatively rapid time scale, so rendering static address delegation from the home to each visited domain highly inefficient. Address delegation may be undertaken in advance of address assignment requests from a visiting mobile node, or address delegation may be triggered by the address assignment request. Information update messages keep the home domain aware of the assignment status of its delegated addresses and can specifically trigger further delegations so that a number of unassigned delegated addresses is maintained.

33 Claims, 11 Drawing Sheets

OTHER PUBLICATIONS

C. Perkins, Editor "IP Mobility Support", Network Working Group, pp. 1-79 (Oct. 1996).

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communication Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support in IPv4", C. Perkins, Ed., Nokia Research Center, Jan. 2002, downloaded from http://www.ietf.org on Dec. 29, 2004, pp. 1-92.

* cited by examiner

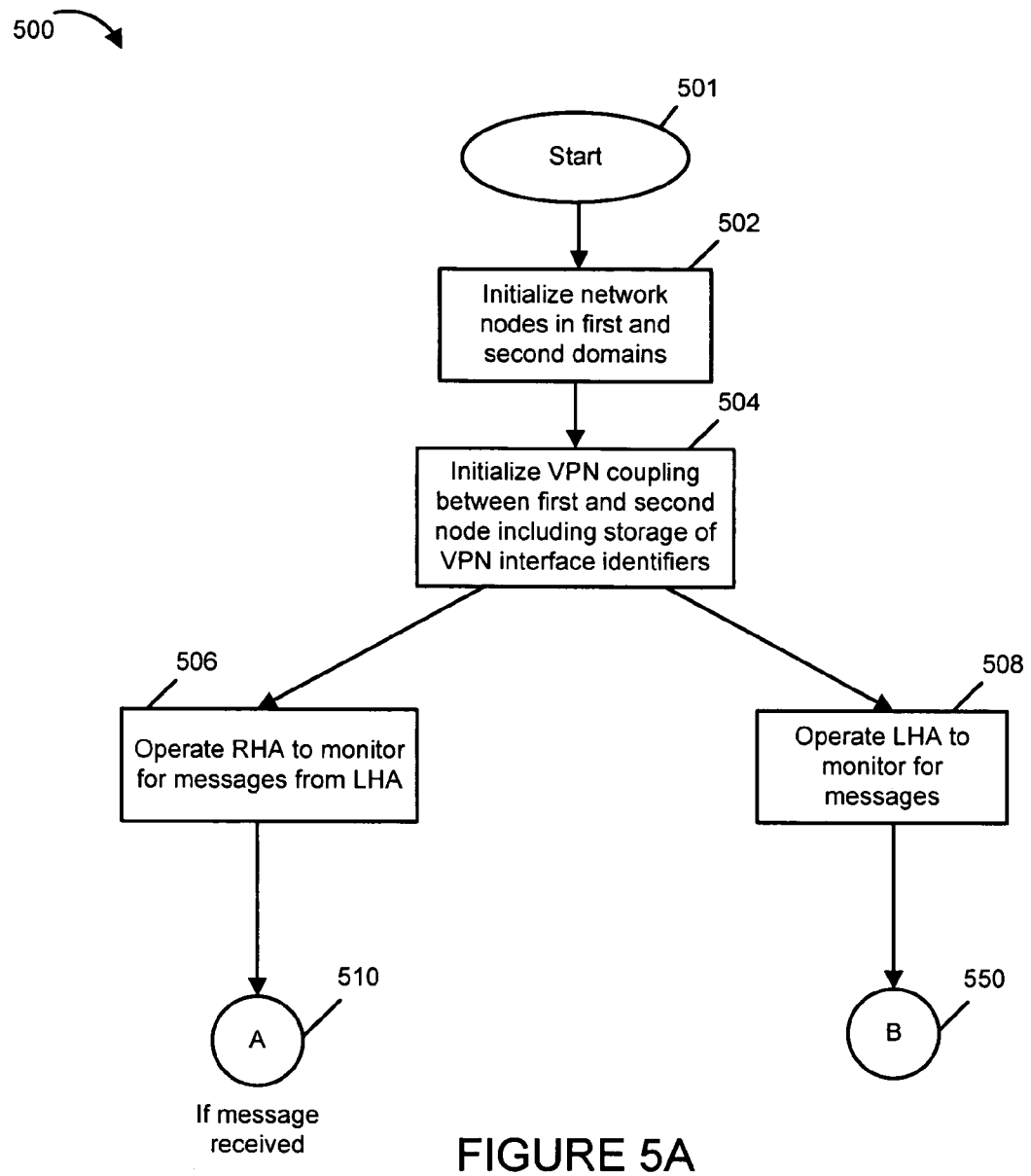

METHODS AND APPARATUS FOR EFFICIENT VPN SERVER INTERFACE, ADDRESS ALLOCATION, AND SIGNALING WITH A LOCAL ADDRESSING DOMAIN

FIELD OF THE INVENTION

The present invention relates to communications systems and, more particularly, to methods and apparatus for efficient addressing delegation and/or assignment and/or signaling in a virtual communications network, e.g., a network supporting virtual private networks (VPNs) and one or more addressing domains.

BACKGROUND

Owners of Internet Protocol (IP) access infrastructure typically need to be able to wholesale their facilities to external Retail Internet Operators. The Layer 2 Tunneling Protocol (L2TP) is typically used today in such circumstances. The retail operator operates the Local Network Server (LNS) whilst the access wholesaler operates the Local Access Concentrator (LAC). The LNS and LAC are separated by a switched connection, and L2TP provides an IP tunnel between the LAC and LNA for forwarding of Point-to-Point Protocol (PPP) frames and users' IP packets. The user is authenticated and authorized using PPP mechanisms and then obtains an IP address from the LNS prefix. The PPP access, LAC and L2TP tunnel then hides that retail address from the wholesale IP routing capabilities. A number of problems are apparent with this architecture when applied to the wholesaling of a mobile wireless access infrastructure. Firstly, placing a LAC at the Access Router in a mobile network, where the Mobile Node (MN) changes Access Routers frequently, creates the need to hand-off a large amount of PPP and L2TP state between Access Routers. In addition, L2TP and PPP themselves are not designed for hand-off and no signaling exists in either protocol to facilitate hand-offs efficiently.

Mobility management in the wholesale domain instead typically requires Mobile IP between the Mobile Node (MN), Foreign Agent (FA) and a Local Home Agent (LHA) in the wholesale domain. This ensures that hand-off signaling is isolated to the wholesale domain to ensure low latency and high availability. MIP already provides capabilities for authentication, authorization and address assignment from a prefix at the LHA. PPP is not then required. MIP was not however designed with wholesaling in mind and a number of additional problems are apparent.

1) A Virtual Private Network (VPN) needs to be established between a VPN Server in the retailer domain and the LHA in the wholesaler domain so that the retailer is responsible for packet forwarding to and from the Internet.
2) The LHA needs to obtain delegated prefixes from that VPN Server in the retail domain so that the addresses assigned to the MN are retailer addresses.
3) The LHA needs to be able to forward packets from multiple retailers, when each retailer is delegating addresses from private address space. This means that the customer's address is not globally unique in the retailer's network, and especially in the FA and LHA.
4) The VPN Server needs to be kept informed by the LHA of what happens to those delegated addresses so that the retailer can manage the retail mobile service given to its customers in that wholesale domain.

In view of the above discussion, it is apparent that there is a need for improved methods and apparatus to provide a more efficient architecture and more efficient signaling to facilitate the hand-off signaling and packet forwarding between retail Internet operators and wholesale Internet operators. Methods and apparatus directed to efficiently establishing and maintaining VPNs between VPN servers in the retailer's addressing domain and a LHA in the wholesaler's addressing domain are needed.

SUMMARY OF INVENTION

The present invention is directed to providing a novel signaling message(s) to enable a retailer to automatically delegate address prefixes to a LHA with which it has a VPN connection. Delegated addresses remain identified as coming from a specific VPN server in the addressing domain of that specific server because the addresses are routable at that specific VPN Server but are not at other servers. In addition, the delegated addresses can include constraints that are used by the LHA to ensure that the delegated addresses are constrained to being assigned only to retailer customers that have a property that meets the identified constraint.

Other features of the present invention relate to how the delegated addresses are associated with a routing entry in the LHA that is independent of the address value but is instead associated with the VPN connection with the VPN server. This ensures that each of the packets from/to retailer customers that have been assigned an address from a specific VPN server are forwarded via that server. This is because neither the source or destination address of the customer's packets can be used for routing. This routing entry in the LHA is determined, for upstream packets traveling towards the VPN server, by information in the packet arriving at the LHA that identifies the VPN server that delegated the packet source address of the packet to the LHA. Therefore every arriving packet is specifically identified as being from one of many retailers connected to that LHA.

Still other features of the invention are directed to forwarding checks in the LHA for packets determined to be destined for the VPN server to ensure that the source address of the packet is both a delegated address from the VPN server, has also been assigned to a MN in the wholesale domain, and the location of the packet sender is the same as has previously been reported to the LHA for that MN and assigned address.

Various aspects of the invention are directed to the process of address assignment at the LHA of an address previously delegated by the VPN server, where the address assignment request from the mobile node includes the retailer domain of the MN so that the address can be given from one of the VPN servers in that retailer domain. The novel address assignment request message of the invention also can include an additional property of the MN that can be used by the LHA to guide address assignment. The property of the MN may be matched to the constraints delivered by the VPN server during delegation.

A novel address assignment response message of the invention that is used to return the address to the MN, can further include the information that associates that address with a specific routing entry in the LHA that points to the delegating VPN server. This information is delivered either to the MN itself, or the FA, to be used in the MIP tunnel encapsulation for upstream packets at the LHA. The LHA can then detect this information, associate it with the routing entry for the delegating VPN server, and then identify the upstream VPN interface at the LHA towards that VPN server.

In accordance with some embodiments of the invention, the invention is directed to a method whereby the address assignment request message triggers the delegation request message, rather than using an address in the LHA that was previously delegated. This is useful when the VPN server itself wants to undertake assignment based on the received MN properties and authentication information, or when there are no remaining delegated addresses that are unassigned at the LHA.

Another feature of the invention is directed to a novel address assignment information update message so that on assignment, the LHA can inform the VPN server of the assignment event, as well as information about the MN that was assigned the address such as the NAI, location information or any of determined property. This information update message can also, in some embodiments, be used to periodically report the location of the MN to the VPN Server, as the MN moves across the wholesale access routers.

Still another feature of the invention is directed to a novel delegated address information update message that is used to inform the VPN server of the status of the addresses that were delegated to the LHA from that VPN server, or from any VPN server in the retailer domain. This information includes the number of addresses assigned or unassigned from the domain, from that VPN server, for each category of addresses and/or for each type of constraint. This information can, in some embodiments, be used at the VPN server to trigger additional address delegations to top-up the available addresses at the LHA.

One feature of the invention is directed to a novel start synchronization message which is used by the LHA to periodically inform the VPN server of how long it has been operating so that the VPN server can detect if the LHA has failed since the last report, and then so that the VPN server can repopulate the state at the LHA that might have been lost during the restart. The synchronization message can, in some embodiments, further include a summary of state at the LHA that the VPN server can compare to its own state to see if they are equal.

DETAILED DESCRIPTION

Figure 1:
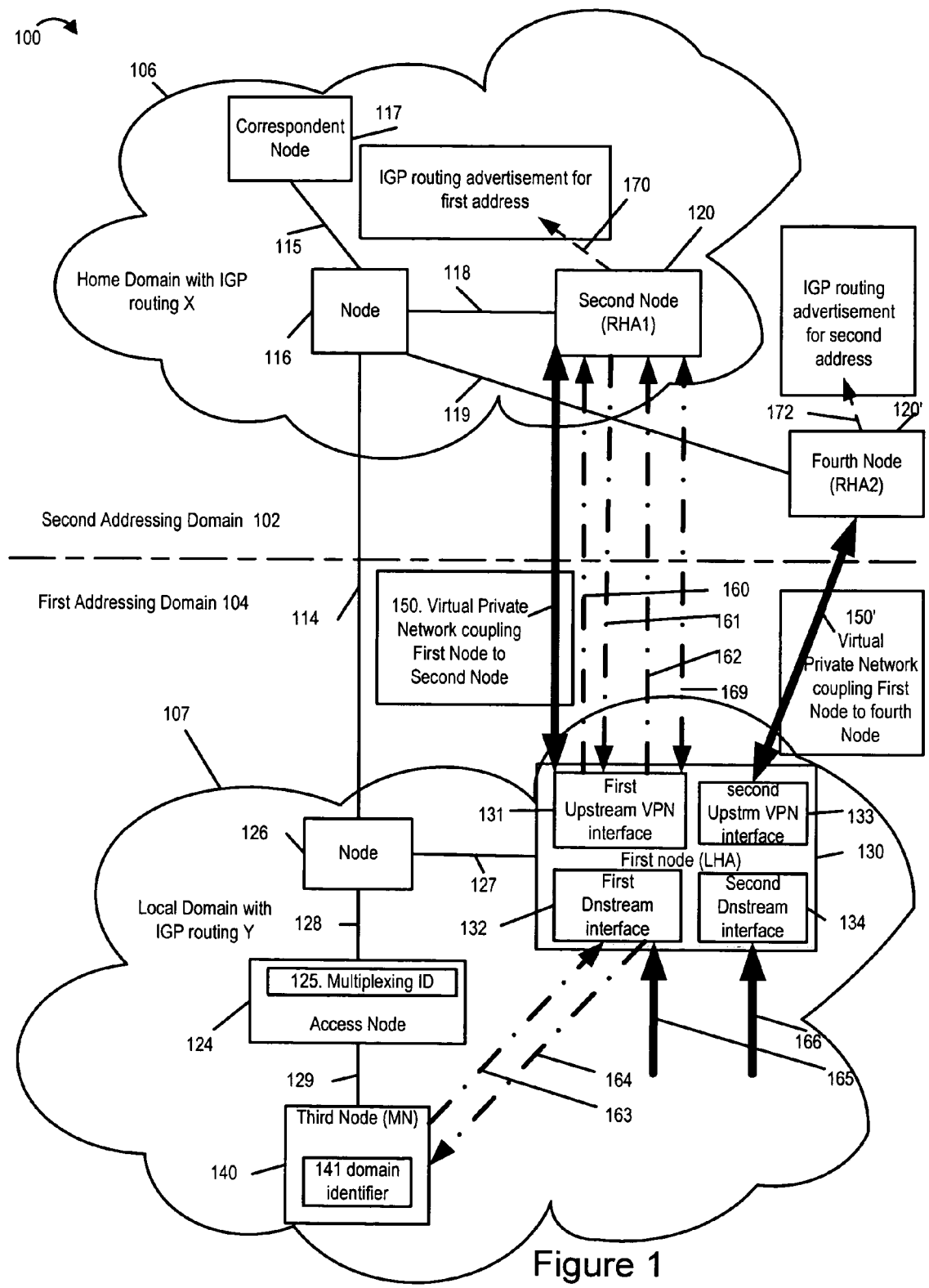
FIG. 1 is a drawing of an exemplary communications system implemented in accordance with the invention and using methods of the present invention.

FIG. 1 shows an exemplary communications system 100, implemented in accordance with the invention, including two addressing domains, a first addressing domain 104 and a second addressing domain 102. The first addressing domain 104 includes a local addressing domain with Interior Gateway Protocol (IGP) routing Y 107, while the second addressing domain 102 includes a home domain with IGP routing X 106. The home addressing domain 106 is realized as a set of links and nodes, that employ the addresses from the second address domain 102. An Interior Gateway Protocol X, e.g., an IGP such as Open Shortest Path First (OSPF), is typically used as the routing protocol in the home addressing domain 106, so that the location of each address in the home addressing domain 106 may be known. An end node can then originate communication packets towards the destination address of another end node, and the routing nodes can then forward said packets towards the location of said destination addresses within the second addressing domain 102. Similarly, the local addressing domain 107 is realized as a set of links and nodes that employ the addresses from the first addressing domain 104, whose locations are known by the IGP Y.

The first addressing domain 104 includes a first node 130, e.g., a LHA node, which is coupled by link 127 to a network node 126. Node 126 is further coupled by link 128 to an Access Node (AN) 124, and to the second addressing domain 102 by link 114 that terminates on network node 116 in the second domain 102. The Access Node 124 is also coupled to a third node 140, which is typically an end node, e.g., a fixed node or a mobile node, by link 129 which may be a fixed or wireless link. The local addressing domain 107 with IGP routing Y includes nodes 124, 126, 127, 130, and links 127, 128, 129.

In the second addressing domain 102 network node 116 is coupled by link 115 to a correspondent node (CN) 117 that engages in packet communications with the third node 140 by sending and receiving packets which include the address of the third node 140. The correspondent node 117, whilst shown in the second addressing domain 102, can be located anywhere in the Internet that supports packet forwarding via the second addressing domain 102 with the third node 140 in the first addressing domain 104. Network node 116 is further coupled by link 118 to a second node 120, e.g., a first Remote Home Agent (RHA) node (RHA1), and by link 119 to a fourth node 120', e.g., a second RHA node (RHA2). The home addressing domain 106 with IGP routing X includes nodes 116, 117, 120 and links 115, 118. The second and fourth nodes 120, 120' are coupled to the first node 130 in the first addressing domain 104 by VPN couplings 150 and 150', respectively. The VPN coupling 150, 150' provides physical (e.g. minimally a link) and routed connectivity (e.g., routing entries) between the LHA 130 and the RHA 126, 120', so that packets including an address delegated from the second addressing domain 102 can be received from the second addressing domain 102 and delivered into the first addressing domain 104, and can be generated in the first addressing domain 104 and forwarded back into the second addressing domain 102. The VPN coupling 150, 150' should also 'hide' the second domain addresses and routing entries, from the first domain routing entries associated with non-VPN routes (i.e., native IGP Y routing entries) associated with the addresses of the first addressing domain 104). The fourth node 120' is shown in the second addressing domain 102 but can be in any domain that can support a VPN coupling 150' between the fourth node 120' and the first node 130 in the first addressing domain 104. The second node 120 delegates addresses to the first node 130 using the inter-domain address delegation message 161, and are associated in the first node 130 with a first upstream VPN interface 131. Addresses delegated from the fourth node 120' are instead associated with a second upstream VPN interface 133 in the first node 130. Additional messages 160,162 and 169 are sent from the first node 130 to the second node 120. Message 160 is an address assignment information update message which is used to inform the second node 120 of an address delegation, said information including details about the MN that has been assigned said delegated address. Message 162 is an address delegation information update message which is used to update the second node 120 with information about the assignment status of the delegated addresses at the first node 130. Message 169 is an address delegation state synchronization message and is used to carry summary state from the first node 130 to the second node 120 so that the second node 120 can check to see if the two nodes 120,130 have synchronized view of the summary state. Messages 160 and 162 can trigger the message 161 so that a pool of delegated addresses is maintained at the first node 130. Message 169 can also be used in the opposite direction (from the second node 120 to the first node 130) to check the synchronization of the summary state at the second node 120 with the state at the first node 130.

The third node 140 includes a domain identifier 141 which indicates that it is a customer of the retailer that operates the second addressing domain 102. When the third node 140 issues an address assignment request message 163 towards the first node 130, via the access node 124, then the third node 140 includes the domain identifier 141 so that the first node 130 understands that the third node 140 requires an address from the second addressing domain 102. The first node 130 could assign an address either from delegated addresses received from the second node 120 in address delegation message 161, such as a first address, or from received addresses that have been delegated from the fourth node 120' such as a second address. The first node 130 assigns the first address to the third node 140 and returns the assigned address to the third node 140 in the address assignment response message 164 via the access router 124. The second address has in addition been assigned to a different end node, such that a received packet 165 at the first node 130 includes the first address as a source address when originated at the third node 140, and packet flow 166 includes the second address as a source address when originated by this different end node.

The first node 130 includes a first and second downstream logical interface 132, 134 over which packet flows 165 and 166 can be received, respectively. Packet flow 165 is determined to be received over the first downstream interface 132 because it includes information associating the source address used by the packet sender as having been delegated by the second node 120. Meanwhile, packet flow 166 is determined to be received over the second downstream interface 134 because it does not contain information associating the source address used by the packet sender as having been delegated by the second node 120, but for example could contain information associating the source address used by the packet sender as having been delegated by the fourth node 120'. Having determined the first or second downstream interface 132, 134 for an arriving packet 165, 166, the first node 130 can identify a routing entry for the arriving packet based either on that interface identifier or directly from the information in the packet that associates that packet with either the second or fourth node 120, 120'. This routing entry selects whether the received packet will be forwarded towards the second node 120 via VPN coupling 150, or towards the fourth node 120' via VPN coupling 150'. This routing entry is independent of the value of the source address, and the first node 130 is therefore capable of supporting multiple such forwarding entries, each associated with a different home address domain such as the second addressing domain 102, with each such domain re-using the same (or more generally overlapping) public or private address space.

FIG. 1 shows one example of such information that associates a packet with a second or fourth node 120, 120', this being a multiplexing identifier (ID) 125 that is known at the access node 124, and which is included into a tunnel packet that further includes a data packet with a source or destination address that is located at the third node 140. Each of the second and fourth nodes 120, 120', and similar nodes in other home domains such as the second domain 102, can be assigned a different multiplexing identifier such as multiplexing ID 125 so that the multiplexing ID received at the first node can identify the correct routing entry. A same or similar multiplexing identifier can be used for downstream packets between the first node 130 and the access node 124 to uniquely identify the third node 140 from other nodes at the access node 124 that have been assigned the same address but from different home domains.

Figure 6:
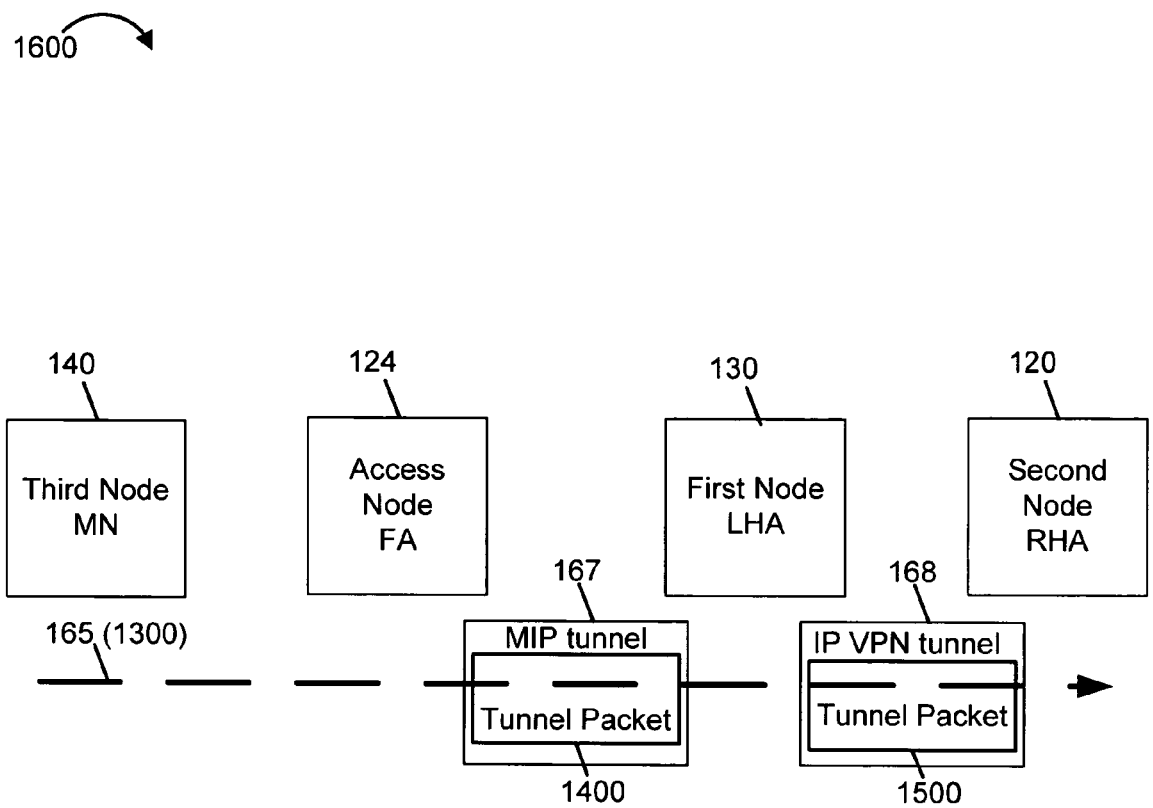
FIG. 6 is a drawing illustrating exemplary forwarding, including encapsulation in tunnels, of an exemplary data packet in the exemplary system of FIG. 1, in accordance with the present invention.

FIG. 6 is a drawing 1600 illustrating exemplary forwarding for an exemplary data packet 165 sent from the home address (HoA) of third node (MN) 140 to the destination address of the Correspondent Node (CN) 117, in the case of Mobile IP based forwarding. The access node (AN) 124 includes a Foreign Agent (FA); the first node 130 includes the Local Home Agent; the second node 120 includes a remote Home Agent (RHA) that acts as the VPN Server. A novel MobileIP tunnel 167 is shown between the access node 124 and the Local Home Agent 130 which is used to redirect the data packet 165 to the LHA 130, and a novel IP VPN tunnel 168 is shown between the Local Home Agent 130 and the Remote Home Agent 120 which is used to further redirect the data packet 165 to the RHA 120. The mobile node (MN) 140 has a shared Foreign Agent Care of Address that is located at the access node 124. The data packet 165 may have the format of exemplary data packet 1300 (See FIG. 13). While in novel MIP tunnel 167, the data packet 165 is encapsulated in the format of exemplary data packet 1400. (See FIG. 14). While in novel IP VPN tunnel 168, the data packet 165 is encapsulated in the format of exemplary data packet 1500. (See FIG. 15).

Figure 13:
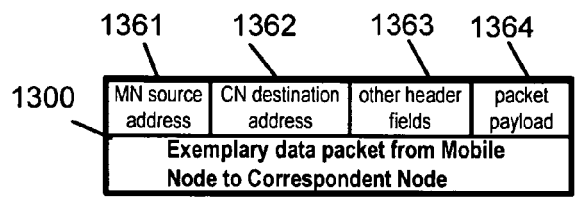
FIG. 13 is an illustration of an exemplary data packet message that may be communicated between communication peers.

FIG. 13 illustrates exemplary data packet 1300, which may be similar or the same as a prior art data packet. Data packet message 1300 includes message parts 1361, 1362, 1363, and 1364. Data packet 1300 has a source address in part 1361 that includes the MN HoA, a destination address in part 1362 that includes the CN address, other packet header fields in part 1363 and the packet payload in part 1364.

Figure 14:
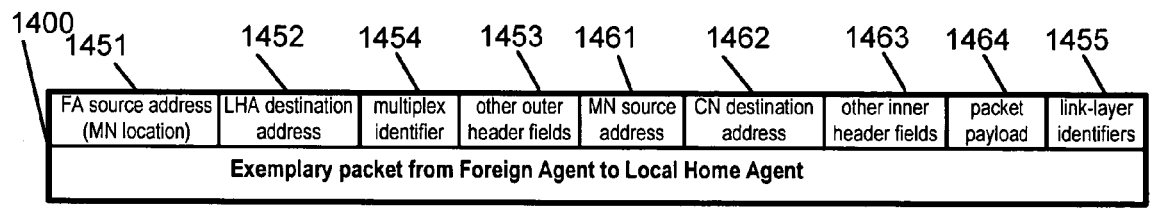
FIG. 14 is an illustration of an exemplary message showing the encapsulation of the data packet message of FIG. 13 into an exemplary MIP tunnel between an Access Node and a LHA, in accordance with the present invention.

FIG. 14 is a drawing of an exemplary message 1400 of an exemplary packet from FA 124 to LHA 130, that shows the encapsulation of the data packet 165 (1300) into the MIP tunnel 167 at the access node 124, in accordance with the invention. Message 1400 includes message parts 1451, 1452, 1454, 1453, 1461, 1462, 1463, 1464, and 1455. Message parts 1461, 1462, 1463 and 1464 are the contents of the message parts 1361, 1362, 1363 and 1364 received by the FA 124 in the data packet 165 (1300), but with possible prior art modifications associated with security and queuing to message part 1363. Message part 1451 is the source address of the MIP tunnel 167 which is the FA Care of Address of the MN 140. Message part 1452 is the destination address of the redirected data packet which is located at the LHA 130. In some embodiments, a unique LHA destination address can be employed by the access node 124 for each RHA 120, as the information in the redirected packet used to identify the RHA 120, and therefore to guide forwarding at the LHA 130. In FIG. 14, the information used to associate the redirected packet with the RHA 120 is instead shown in message part 1454, which contains the multiplexing Identifier 125 stored in the access node 124 for the home address in message part 1461 of the MN 140. Message part 1453 includes other outer header fields which may potentially be dependent on the other message parts from FIG. 14 according to prior art encapsulation processing. Finally, message part 1455 includes link-layer identifiers which can be used in addition to, or instead of the message parts 1452 and 1454 to identify the routing table entry at the LHA 130, or alternatively can be used to indicate a specific routing entry in the RHA 120 out of a plurality of such routing entries that are associated with a specific routing entry at the LHA 130 that is associated with the data packet 165. Examples of such link-layer identifiers are MPLS labels, virtual circuit identifiers, frame source and destination addresses.

Figure 15:
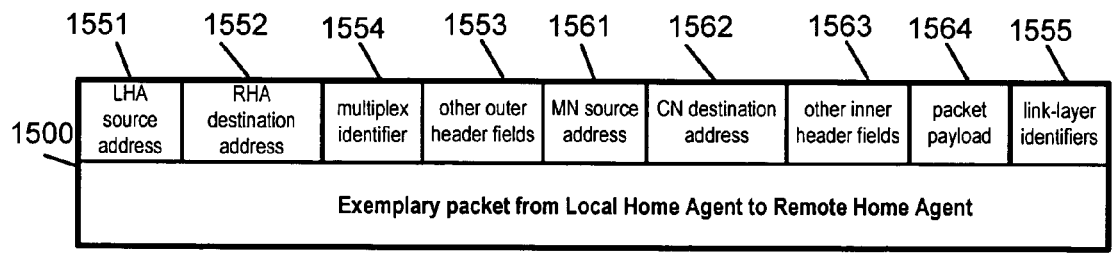
FIG. 15 is an illustration of an exemplary message showing the encapsulation of the data packet message of FIG. 13 into an exemplary IP VPN tunnel between a LHA and a RHA, in accordance with the present invention.

FIG. 15 shows an exemplary message 1500 illustrating the encapsulation of the data packet 165 into the IP VPN tunnel 168 at the Local Home Agent 130, in accordance with the invention. Message 1500 includes message parts 1551, 1552, 1554, 1553, 1561, 1562, 1564, and 1555. Message parts 1561, 1562, 1563 and 1564 are the contents of the message parts 1461, 1462, 1463 and 1464 received in the redirected data packet 1400 of MIP tunnel 167, but with possible prior art modifications associated with security and queuing to message part 1463. Message part 1551 is the source address of the IP VPN tunnel 168 which is an address of the LHA 130. Message part 1552 is the destination address of the redirected data packet which is located at the RHA 120. In some embodiments, a unique LHA source or RHA destination address can be employed by the LHA 130, RHA 120 to identify a specific routing entry at the RHA 120 for the data packet 165, and a specific routing entry at the LHA 130 for a data packet in the reverse direction including said addresses. In other embodiments, a specific multiplexing identifier in message part 1554 or in link-layer identifier 1555 can additionally or alternatively be used for this purpose. Message part 1553 finally includes other outer header fields which may potentially be dependent on the other message parts from message 1500 according to prior art encapsulation processing. Whilst the above forwarding has primarily been described for IP tunnel encapsulation for a packet 165 in message 1400 in MIP tunnel 167 and a packet 165 in message 1500 in IP VPN tunnel 168, it will be clear to those skilled in the art that other packet redirection and switched VPN technologies can alternatively and/or additionally be used.

Figure 2:
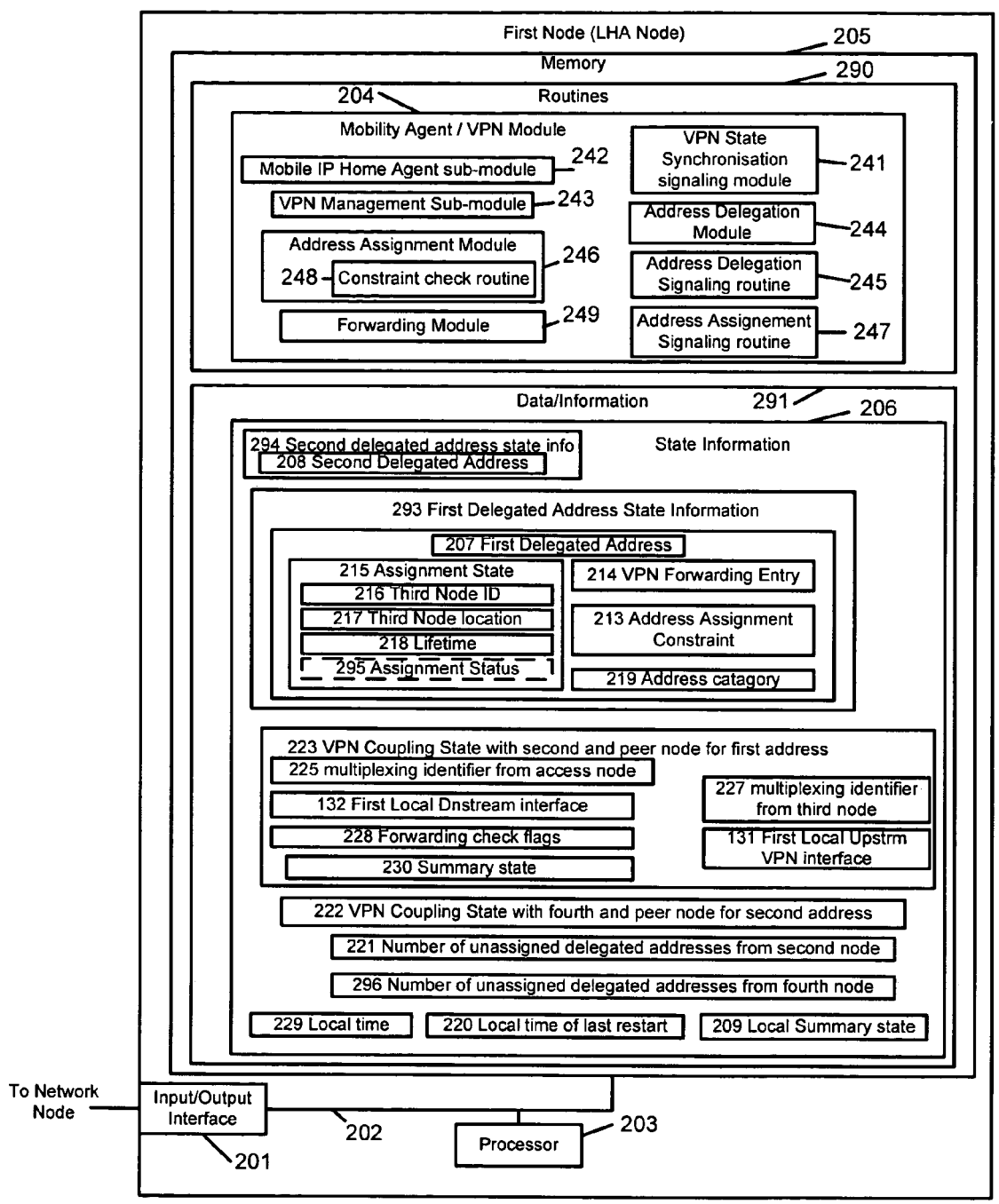
FIG. 2 is a drawing of an exemplary first node, e.g., an exemplary LHA node, implemented in accordance with the present invention and using methods of the present invention.

FIG. 2 shows an exemplary first node 130, e.g., a LHA node, implemented in accordance with the present invention that performs the methods of the present invention. The first node 130 includes an input/output interface 201 used to couple the first node 130 to other network nodes of the communications system. The input/output interface 201 is coupled to a processor 203 and a memory 205 by a communications bus 202. Memory 205 includes routines 290 and data/information 291. The processor 203, e.g., a CPU, executes the routines 290 and uses the data/information 291 stored in the memory to operate the first node (LHA node) 130 and implement methods of the present invention.

Routines 290 includes a mobility Agent/VPN Module 204. The mobility Agent/VPN module 204 includes a VPN state synchronization signaling module 241, a mobile IP home agent sub-module 242, a VPN Management sub-module 243, an address delegation module 244, an address delegation signaling routine 245, an address assignment module 246, an address assignment signaling routine 247, and a forwarding module 249.

Mobile IP Home Agent sub-module 242 is used to perform mobility operations including mobility signaling and data packet redirection, in support of the third node 140, optionally in combination with the access node 124. The VPN management sub-module 243 manages the VPN couplings 150, 150' between the first node 130, and both the second node 120 and the fourth node 120'. The address delegation module 244 is used to manage addresses that may be delegated from the second node 120 and from the fourth node 120'. This address management includes employing the address delegation signaling routine 245 to send and receive novel signals with the second node 120 to request and report the status of delegated addresses. The address assignment module 246 is used to manage the assignment of addresses to end nodes such as the third node 140, following the delegation of said addresses from the second node 120. The address assignment module 246 includes a constraint check routine 248 used to ensure that a constraint associated with a delegated address from the second node 120, is met by a property of the third node 140 before said delegated address can be assigned to that third node 140. This constraint routine 246 specifically supports authentication of authentication parameters that are received from the third node 140 as a property. The address assignment module 246 employs the novel address assignment signaling routine 247 to report assignment events to the second node 120 that are associated with addresses delegated from the second node 120. The address assignment signaling routine 247 optionally includes signaling to receive a request for address assignment from the third node 140 and to assign the address to that third node 140. Alternatively, the address assignment signaling with the third node 140 is included in the mobility signaling included within the Mobile IP Home Agent sub-module 242. The forwarding module 249 undertakes packet forwarding between the VPN couplings 150,150' and the mobile IP packet redirection mechanism, within the first node 130, for a first delegated address 207 and a second delegated address 208.

These various routines, modules, and sub-modules operate on state information 206 stored in data/information 291 in memory 205. State Information 206 includes state information for each delegated address. State information 206 includes first delegated state information 293, second delegated state information 294, summary state 209, VPN coupling state with second and peer node for first address 223, VPN coupling state with fourth and peer node for second address 222, number of unassigned delegated addresses from second node 221, number of unassigned delegated addresses from fourth node 296, local time 219, and local time of last reset 220.

First delegated address state information 293 includes a first address 207, an address category 219 indicating, for example, whether this address is a public, private IPv4 or IPv6 address. First delegated address state information 293 further includes a VPN forwarding entry 214 indicating the VPN coupling 223 towards the second node 120 that is associated with the first address 207 for forwarding purposes as a result of the delegation of that first address 207 from the second node 120. An address assignment constraint 213 may be associated with the first address 207 to indicate a requirement for a property of the third node 140 that should be satisfied for that first address 207 to be assigned to that third node 140. The first delegated address state information 293 further includes assignment state 215 which indicates an identity 216 of the third node 140 that has been assigned the first address 207, and a location 217 of the third node 140 which, for example, may be a geographical location indicated by Global Positioning System or other map coordinates, but preferably is the address of the access node 124 to which the third node 140 is connected, said address, for example, being a Mobile IP Foreign Agent Care of Address. Assignment state 215 also includes a lifetime 218 which indicates the amount of time remaining for the address assignment to the third node 140 but can alternatively be stored as the time of assignment and the time of assignment cessation, such that the current time value at the first node 130 can be used to determine the time for unassigning the first address 207. When the assignment state 215 does not include a third node identifier 216 and/or the assignment period has expired, then the first address may, in some embodiments, be considered to be unassigned. Alternatively, specific additional state 295 such as a flag may, in some embodiments, be used included to indicate assignment status. The state information 206 also includes similar state, second delegated address state information 294 associated with a second delegated address 208 which is delegated from the fourth node 120'.

The state information 206 further includes VPN coupling state 223 associated with the second node 120, and with the redirection mechanism for the first address 207 between the first node 130 and a tunnel endpoint peer node, which may be either the third node 140 that has been assigned the first address 207, or preferably the access node 124 to which said third node 140 is connected. The VPN coupling state with the second and peer node for first address 223 includes the first local downstream interface 132, the first local upstream interface 131, a multiplexing identifier 225 from the access node, a multiplexing identifier 227 from the third node, and forwarding check flags 228. The first local downstream interface 132 is used for sending and receiving packets with the third node 140; the first local upstream interface VPN interface 131 is used for sending and receiving packets with the second node 120 through the VPN coupling 150. Redirected packets from the third node 140 can include a multiplexing identifier 227 to indicate that the redirected data packet is associated with the second node 120 and should be forwarded using the first local upstream interface 131. Alternatively, data packets from the third node 140 are redirected at the access node 124 and it is the access node 124 that adds a multiplexing identifier 225 that is used to associate the redirected data packet with the VPN coupling state 223 and the local upstream VPN interface 131 towards with the second node 120. VPN coupling state 222 with fourth and peer node for second address similarly stores state associated with the VPN coupling 150' to the fourth node 120' and associated redirection state for data packets that include the second delegated address 208. A different multiplexing identifier than that included in state entries 225, 227 should be included within VPN coupling state 222 so that multiplexing identifiers associate a redirected packet with either the VPN coupling 150 or 150' via coupling state 222 or 223, respectively. Alternatively, the role of the multiplexing identifier, e.g., identifier 225 or 227, to associate a redirected packet with a VPN coupling 150 or 150', can instead be performed by an address at the first node 130 that is included in a redirected packet that is specific to a specific VPN coupling, or by link-layer identifiers that arrive with a redirected packet at the first node 130, or in fact any combination of link-layer, redirected packet addresses and multiplexing identifiers within redirected packets. Whichever method is used to associate a redirected packet with the second node 120, the VPN coupling state includes forwarding check flags 228 which are used by the forwarding module 249 to undertake additional analysis of the redirect packet before forwarding it through the determined VPN coupling 150, 150'. These checks can include verification that the source address of the data packet from an end node that is located within the redirected packet, and that is destined for the second node 120, that it includes an address that is delegated from the second node 120, and/or that said included address is currently assigned at the first node 130 (for example to the third node 140), and/or that the redirected packet was received from a node that has a location that matches the third node location 217, said location being identified by the source address of the redirected packet received at the first node 130, by a multiplexing identifier 225, 227 in the redirected packet, and/or by link-layer identifiers associated with the received redirected packet.

The state information 206 also includes the local time 229 at the first node 130 that is used for time based options including determining the address assignment time and the address unassignment time associated with a specific assignment lifetime 218. Local time 229 is also used to store a local time of the last program restart 220 at the first node 130, and hence the duration of the current program operations at the first node 130. Information 221 includes the number of unassigned delegated addresses from the second node 120 which can be further broken down into the number of unassigned address in each address category and/or for each constraint, said numbers can alternatively be determined by analyzing the delegated address information in state 293 and similar such state, corresponding to other delegated addresses from the second node 120. The number of assigned addresses can then be analyzed locally or communicated to the second node 120 in a novel message so that additional address delegations can be performed. Similarly, information 296 includes the number of unassigned delegated addresses from the fourth node 120' which can be further broken down into the number of unassigned address in each address category and/or for each constraint, said numbers can alternatively be determined by analyzing the delegated address information in state 294 and similar such state, corresponding to other delegated addresses from the fourth node 120'. The number of assigned addresses can then be analyzed locally or communicated to the fourth node 120' in a novel message so that additional address delegations can be performed.

The VPN state synchronization signaling module 241 undertakes novel signaling to ensure that the first node 130 and the second node 120 are aware of each others status by communicating the local time of the restart 220, or the duration since the last restart, to enable the second node 120 to detect a restart event and the associated loss of state. Summary state 209 is used to summarize state that needs to be synchronized with the second node 120 and/or fourth node 120'. This summary information can then be communicated in a novel message to the second node 120 where it can be compared to local summary state at the second node 120, so that differences can be detected and subsequently eliminated. Summary information 209 used for synchronization may include the information that is used to control the VPN coupling 150, and the address delegation, and the address assignment, and packet forwarding state associated with that VPN coupling 150.

Figure 3:
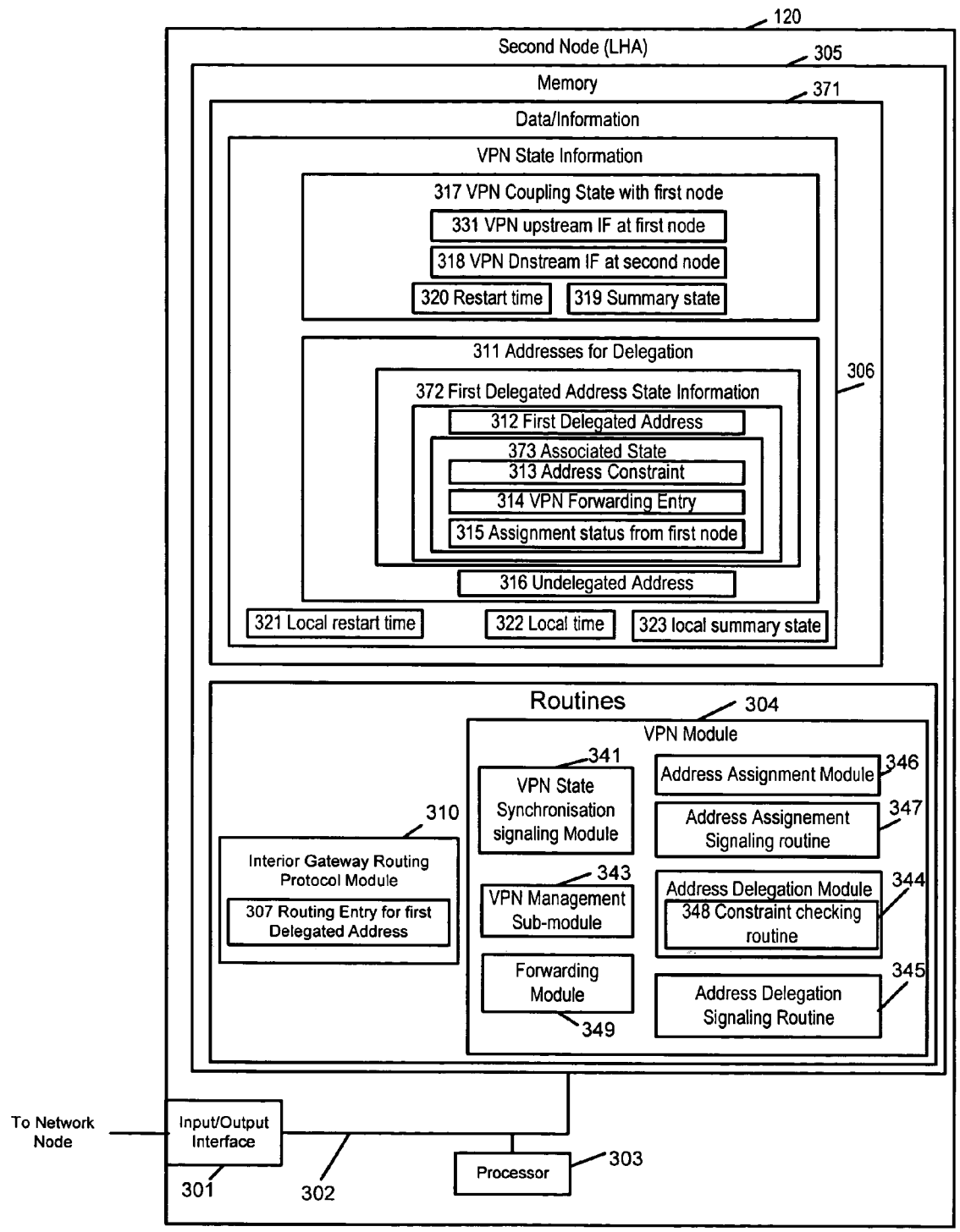
FIG. 3 is a drawing of an exemplary second node, e.g., an exemplary RHA node, implemented in accordance with the present invention and using methods of the present invention.

FIG. 3 shows an exemplary second node (RHA) 120 implemented in accordance with the invention that performs the methods of the invention. FIG. 3 may also represent the equivalent functions of the fourth node 120'. The second node 120 includes an input/output interface 301 used to couple the second node 120 to other network nodes of the communications system. The input/output interface 301 is coupled to a processor 303, e.g., a CPU, and a memory 305 by a communications bus 302 over which the various elements may interchange data and information. Memory 305 includes routines 370 and data/information 371. The processor 303 performs the operations of the invention using data/information 371 stored in the memory 205, under the instruction of routines 370, e.g., program modules, stored in memory 305. Routines 370 include a VPN module 304 and an interior gateway routing protocol module 310.

The interior gateway routing protocol module 310 is used to transmit routing advertisements for the addresses that are located at the second node 120 from a routing perspective, said addresses then being available for delegation to the first node 130. Specifically, a routing entry 307 exists for a first delegated address 312 so that data packets with a destination address that includes the first delegated address 312 will be delivered by the routing system to the second node 120. The VPN module 304 includes a VPN state synchronization signaling module 341, a VPN management sub-module 343, an address delegation module 344, an address delegation signaling routine 345, an address assignment module 346, an address assignment signaling routine 347, and a forwarding module 349. The VPN management sub-module 343 manages the VPN couplings 150 between the second node 120 and the first node 130. The address delegation module 344 is used to manage addresses that may be delegated from the second node 120 to the first node 130. This includes employing the address delegation signaling routine 345 to send and receive novel signals with the first node 130 to delegate addresses and to receive information on the status of such delegated addresses. The address delegation module 344 further includes a constraint check routine 348 used to ensure that a constraint associated with a delegated address from the second node 120, is met by a property of the third node 140 before said delegated address can be assigned to that third node 140 at the first node 130. This constraint checking routine 348 specifically supports authentication of authentication parameters that are received from the third node 140 as a property. The address assignment module 346 is used to track the assignment of addresses to end nodes such as the third node 140, following the delegation of said addresses to the first node 130. The address assignment module 346 employs the novel address assignment signaling routine 347 to report assignment events to the second node 120 that are associated with addresses delegated from the second node 120. The forwarding module 349 undertakes packet forwarding for packets associated with the VPN couplings 150, for a first delegated address 312.

These various routines, modules, and sub-modules operate on VPN state information 306 stored in memory 305. VPN state information 306 includes a block of addresses for delegation 311 which includes a block of addresses that are not yet delegated 316. The block of addresses 311 further includes first delegated address state information 372 and additional state information for other addresses that have been delegated. First delegated address state information 372 includes the first delegated address 312 and associated state 373. This associated state 373 includes a VPN forwarding entry 314 indicating the VPN coupling 317 towards the first node 130 that is associated with the first address 312 for forwarding purposes as a result of the delegation of that first address 312 to the first node 130. Associated state 373 may also include an address assignment constraint 313 associated with the first address 312 to indicate a requirement for a property of the third node 140 that should be satisfied for that first address 312 to be assigned to that third node 140 by the first or second node 120, 130. Associated state 373 further includes assignment status state 315 which is some subset of the assignment status state 215 at the first node 130, which indicates for example the identity of the third node 140 that has been assigned the first address 312.

The state information 306 further includes VPN coupling state 317 associated with the first node 130. The VPN coupling state 317 includes a local VPN downstream interface 318 at the second node used for sending and receiving packets with the first node 130 through the VPN coupling 150. VPN coupling state 317 also includes a VPN upstream interface state 331 on the first node 130, a restart time 320 and a summary state 319 of the first node 130 that have been communicated to the second node 120 by the first node 130. The state information 306 also includes local time 322 at the second node 120 that is used for time based operations including determining the address delegation time. Local time 322 is also used to store the local time of the last program restart 321 at the second node 120, and hence the duration of the current program operations at the second node 120. VPN state information 306 also includes local summary state 323 that is obtained from a summarization process that is undertaken on the state stored in the second node 120 that is associated with and/or dependent on the first node 130.

The VPN state synchronization signaling module 341 undertakes novel signaling to ensure that the first node 130 and the second node 120 are aware of each others status by communicating the local time of the restart 229 and the summary state 209 at the first node 130 to the second node 120 to be compared to the previously stored values 320, 319 so changes can be detected and resynchronization procedures initiated by the VPN management sub-module 343 using the VPN state synchronization signaling module 341. Similarly, the summary state 323 at the second node 120 can be sent by the VPN state synchronization signaling module 341 to the first node 130, for comparison with previously stored summary state 230.

Figure 4:
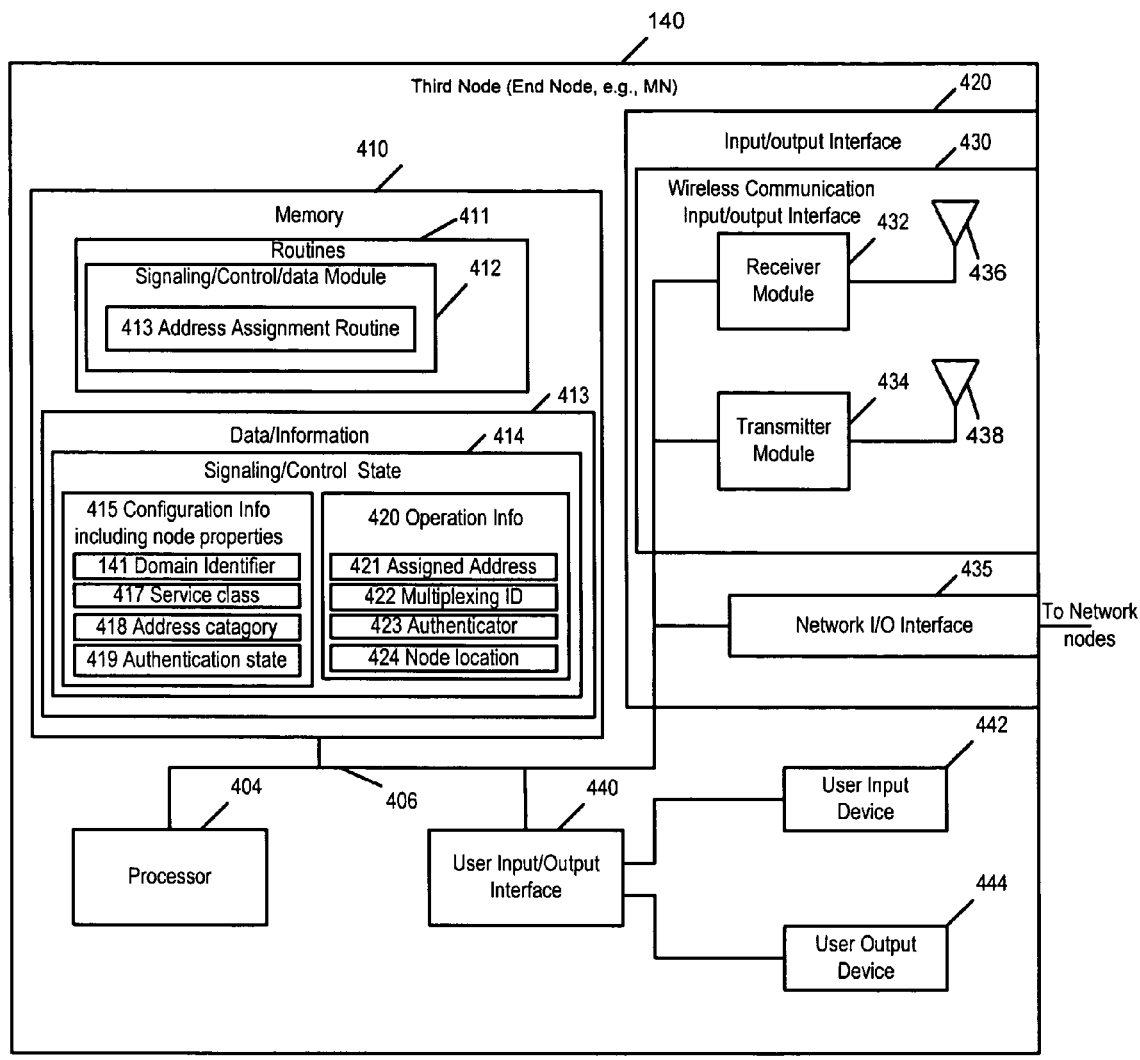
FIG. 4 is a drawing of an exemplary third node, e.g., an exemplary end node such as a MN, implemented in accordance with the present invention and using methods of the present invention.

FIG. 4 is a drawing of an exemplary third node 140 implemented in accordance with the present invention and using methods of the present invention. Exemplary third node 140 is an end node, e.g., a MN. Exemplary third node 140 may be coupled to the exemplary access node 124, and may be used in the exemplary communications system 100 of FIG. 1. The third node 140 includes an input/output interface 420 used to couple the first node 140 to the access node 124. I/O interface 420 may include a wireless communications I/O interface 430 and a network I/O interface 435. Wireless communications I/O interface 430 is used when the link between the third node 140 and the AN 124 is a wireless link, while network I/O interface 435 is used when the link is a wired link. Wireless communication input/output interface 430 includes a receiver antenna 436 coupled to a receiver module 432, and a transmitter antenna 438 coupled to a transmitter module 434. The input/output interface 420 is coupled to a processor 404, e.g., a CPU, a memory 410, and a user input/output interface 440, by a communications bus 406 over which the various elements may interchange data/information. User input/output interface 440 is then coupled to user input device 442, e.g., a keypad, microphone, camera, etc., used to receive inputted information from the user such as typed text and/or audio/visual information. User I/O interface 440 is also coupled to a user output device 444, e.g., a video display, speaker, etc., used to deliver information to a user such as text to a screen, visual information to a screen and/or audio to a speaker.

Memory 410 includes routines 411 and data/information 413. The processor 404 executes the routines 411 and uses the data/information 413 in memory 410 to control the operation of the third node 140 and implement methods of the present invention. Routines 411 includes a signaling, control and data module 412 that is used to manage the mobility of the third node 140, including maintenance of the redirection mechanism at the first node 130. Module 412 additionally includes features that enable the transmission and reception of data packets. Module 412 includes an address assignment routine 413 used to request address assignments from the first node 130, of an address that has been delegated from the second node 120.

Data/Information 413 includes signaling/control state 414. Signaling/control state 414 includes configuration information including node properties 415 and operation information 420. The configuration information 415 includes properties of the third node 140 used to guide address assignment at the first node 130, when said properties are included in address assignment signals. The node properties included in configuration info 415 are: a domain identifier 141 that indicates that the third node 140 is associated with the second address domain 102 and hence may be assigned an address that was delegated by the second or fourth nodes 120, 120' that are located in the second domain 102; a service class 417 of the third node 140 that can indicate a priority for an address, or a specific address pool at the first node 130, from which an address can be assigned; an address category 418 which indicates for example whether a public, private, IPv4 or IPv6 address is required; and authentication state 419 that may be communicated to the first, second and fourth nodes 130, 120, 120' so that the first node 130 identity can be verified before an address is assigned to the third node 140.

Operation information 420 includes: an assigned address 421 which is the first delegated address; a multiplexing identifier 422 when the third node 140 is the peer of the first node 130 for the redirection mechanism (such as an IP in IP Mobile IP tunnel for a Colocated Care of Address); an authenticator 423 which is derived from the authentication state 419 for inclusion as a property in an address assignment signal; and a node location 424 of the third node 140, which for example can be either a Colocated Care of Address of a Care of Address of the access node 124 to which the third node 140 is coupled. Node location 424 can be reported to the first node 130 so that the first node 130 can then redirect packets to the correct location, and so that the first node 130 can drop packets that are received from a different location that could therefore have been generated by another node that is undertaking an attack on the communications system.

Figure 5B:
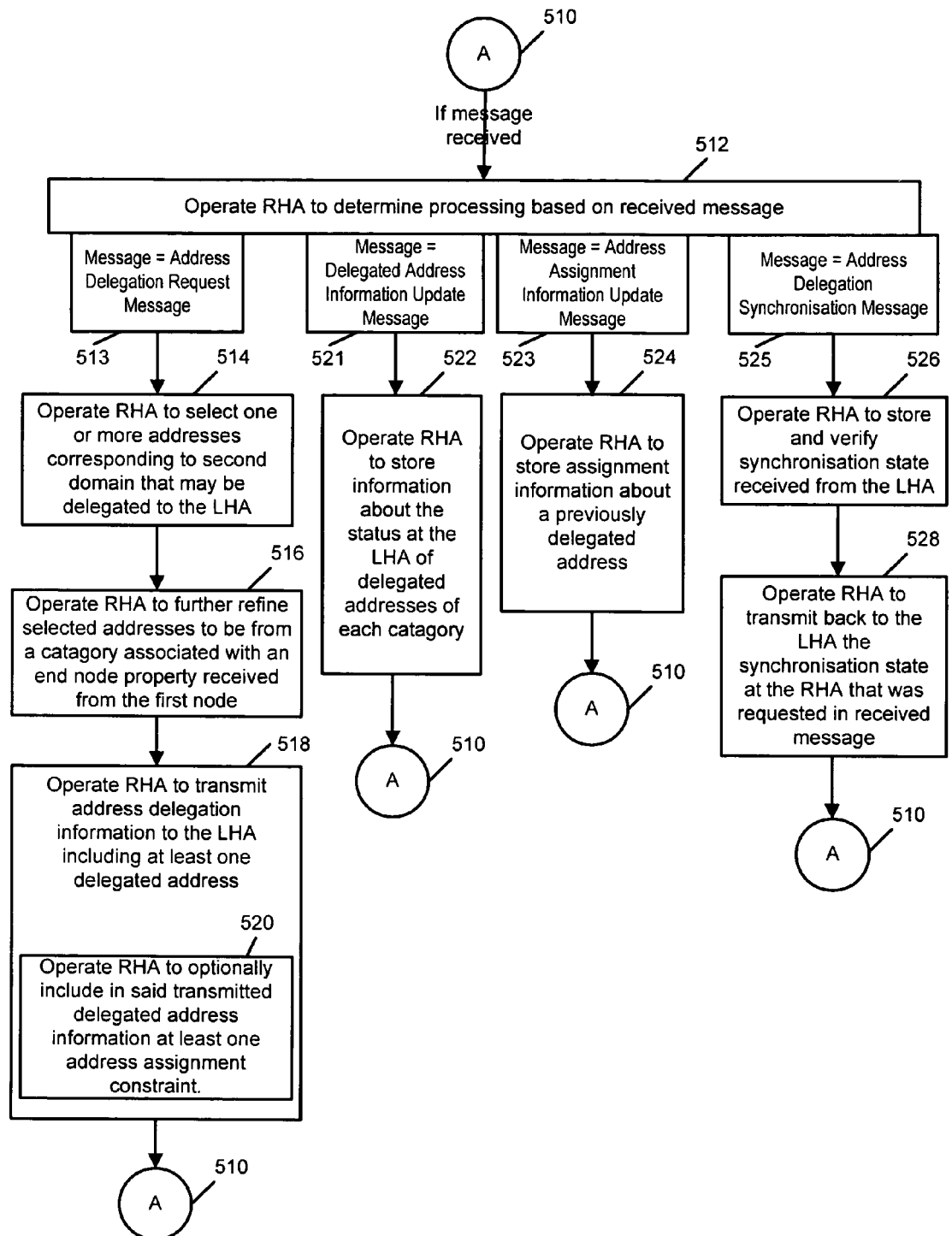
FIG. 5, which comprises the combination of FIGS. 5A, 5B, 5C, and 5D is a flowchart illustrating exemplary methods of the invention including operations that are performed by exemplary first (LHA), second (RHA), and third (MN) nodes, in accordance with the present invention.
Figure 5C:
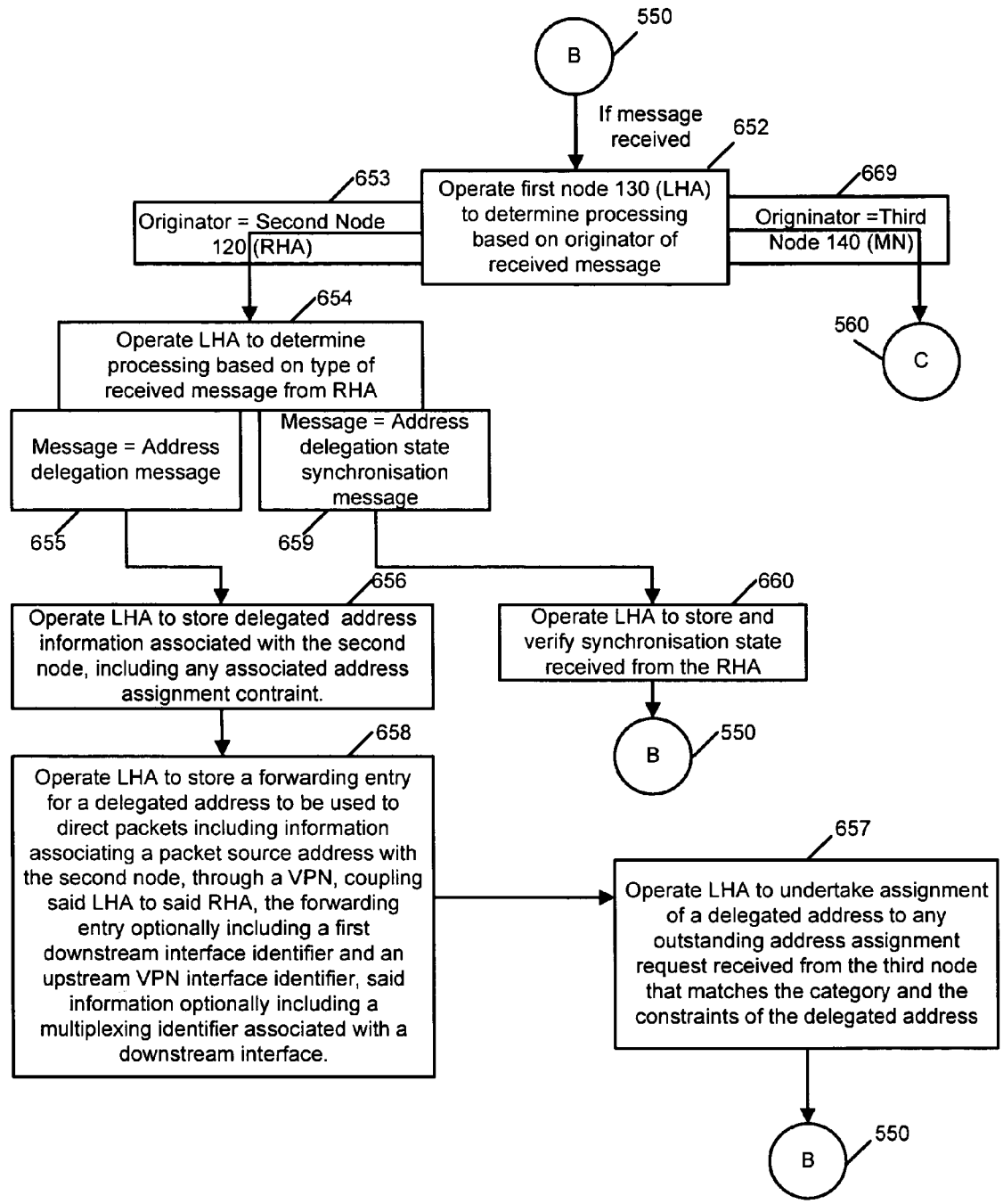
Figure 5D:
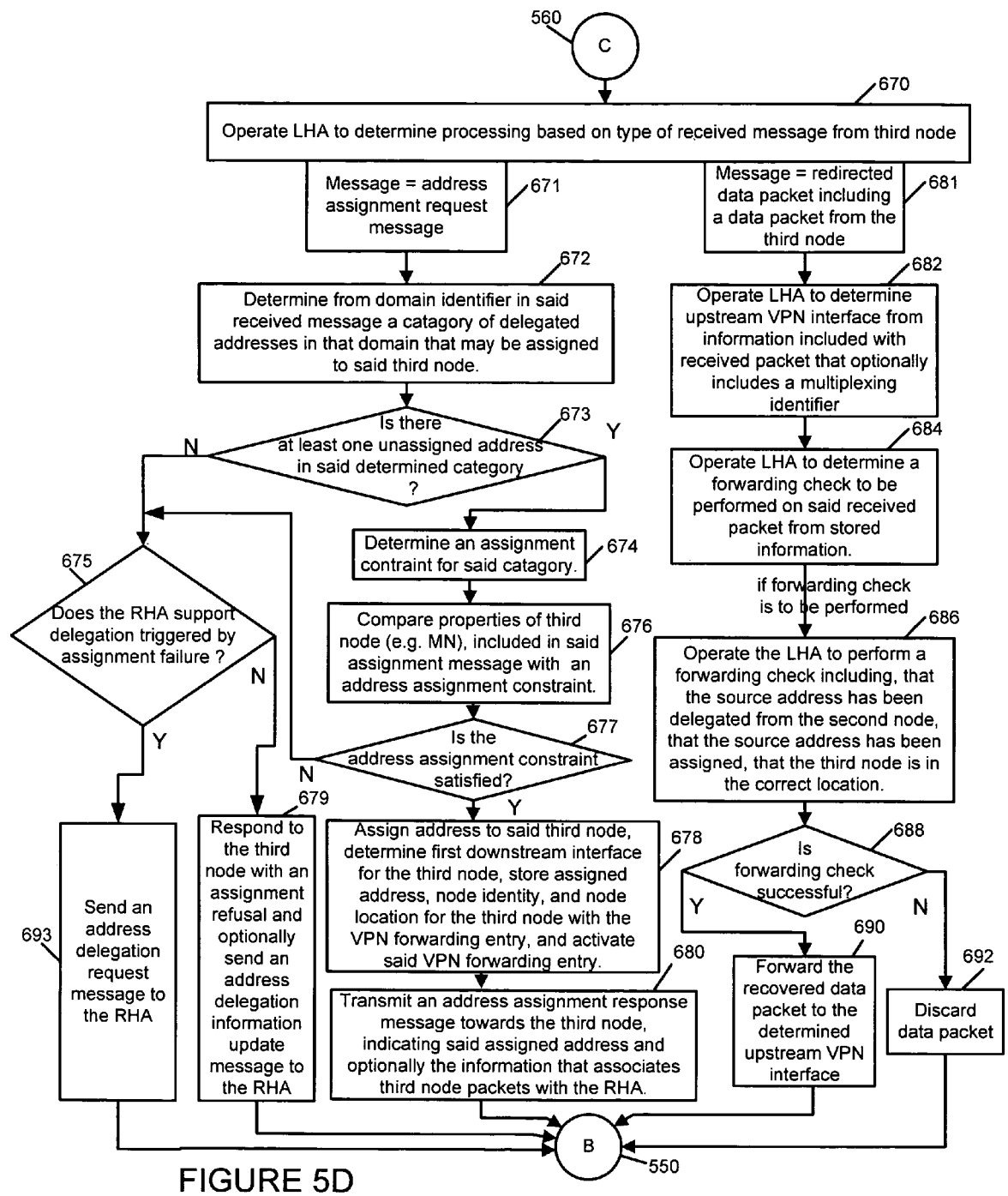

FIG. 5, which comprises the combination of FIGS. 5A, 5B, 5C, and 5D, is a flowchart 500 illustrating exemplary methods of the invention that are conducted by the exemplary first (LHA), second (RHA), and third (MN) nodes, (130,120,140), respectively. The method starts at step 501 and progresses to step 502 where the network nodes in the first 104 and second 102 addressing domains are initialized. Next, in step 504, the VPN coupling 150 between the first and second nodes 130, 120 is initialized. Step 504 includes the storage of the various VPN identifiers used at either end of the coupling. Operation proceeds from step 504 to steps 506 and 508.

In step 506, the second node 120 (RHA) is operated to monitor for messages from the first node 130 (LHA), and the method moves to step 510 (node A) where the RHA 120 waits for received messages. When a message is received, the method moves to step 512 where the RHA 120 is operated to determine processing based on the received message. If the RHA 120 has received an address delegation request message (event 513), then the method moves to step 514 where the RHA 120 is operated to select one or more addresses corresponding to the second addressing domain 102, that may be delegated to the LHA 120 that transmitted the address delegation request message to the RHA 120. Next, in step 516, the RHA 120 is operated to further refine the selected address(es) to be from a category of addresses associated with a property of an end node received from the first node 130, e.g., a property associated with MN 140. Next, in step 518, the RHA 120 is operated to transmit address delegation information for the LHA 130 including as least one selected address for delegation, e.g., in message 700. Step 518 includes sub-step 520. In sub-step 520, the RHA 120 is operated to optionally include in said transmitted delegation information, at least one address assignment constraint that is associated with said delegated address (e.g. that defines the category of the delegated address). The method then returns to step 510 to await further messages.

Returning to step 512, if the received message is a delegated address information update message (event 521, e.g., message 1100) then, in step 522, the RHA 120 is operated to store information about the status at the LHA 130 of the addresses that have been delegated from the RHA 120 to the LHA 130, including such information as, for example, the number of unassigned delegated addresses in each category. The method then moves to step 510 to await additional messages.

Returning to step 512, if the received message is an address assignment information update message (event 523, e.g., message 1000) then the method moves to step 524 where the RHA 120 is operated to store assignment information that is received in said message and which is associated with the assignment at the LHA 130 of a previously delegated address from the RHA 120. The method then moves to step 510 to await the reception of further messages.

Returning to step 512, if the received message is an address delegation state synchronization message (event 525, e.g., message 1200), then in step 526, the RHA 120 is operated to store synchronization state received in said message from the LHA 130 and to verify it by comparing to the RHA 120 version of the state at the LHA 130 to ensure they are compatible. Next, in step 528 the LHA 130 is operated to transmit back to the LHA 130 the latest version of the local synchronization state information that is stored at the RHA 120, that was requested in the received message. The method then moves to step 510 to await further received messages.

Returning to step 504, the method also moves to step 508 where the LHA 130 is operated to monitor for received messages and the method then moves to step 550 (node B) to await such messages.

From step 550 (node B), the method moves to step 652 when a message is received by the LHA 130. In step 652, the first node (LHA) 130 is operated to determine the processing based on the originator of the received message. If the originator was the second node 120 (RHA) (event 653) then the method moves to step 654 where the LHA 130 is operated to determine processing based on the type of the received message from the RHA 120. If the message is an address delegation message (event 655, e.g., message 700) then in step 656 the LHA 130 is operated to store delegated address information associated with the second node 120 (RHA), including any associated address assignment constraint. Next, in step 658, the LHA 130 is operated to store a forwarding entry for a delegated address to be used to direct packets including information associating a packet source address with the second node (RHA) 120, through a VPN 150, that couples the LHA 130 to the second node 120 (RHA), the forwarding entry optionally including a first downstream interface identifier and an upstream VPN interface identifier, said information optionally including a multiplexing identifier associated with a downstream interface of the LHA 130. A received packet is then associated with the VPN coupling 150 to the second node (RHA) 120, via the stored forwarding entry information, using at least one of said packet source address, the multiplexing identifier, and the downstream interface identifier. Next in step 657, the LHA 130 is operated to undertake assignment of a delegated address to any outstanding address assignment request that has been received from the third node 140, and that matches the category and the constraints of the delegated address. Next, in the step 550 (node B), the LHA 130 awaits further messages.

Returning to step 654, if the message is alternatively an address delegation state synchronization message (event 659), e.g., message 169, received from the RHA 120, then in step 660 the LHA 130 is operated to store the received RHA 120 synchronization state from the RHA 120, and to verify it by comparing it to the LHA 130 version of the RHA 120 synchronization state to ensure they are equivalent. Next, the method moves to step 550 (node B) to await further messages.

Returning to step 652, if the received message is alternatively received from the third node 140 (MN) (event 669), then operation proceeds via connecting node C 560 to step 670. In step 670 the LHA 130 is operated to determine processing based on the type of the received message from the third node 140. If in step 670, the message is determined to be an address assignment request message (event 671, e.g., message 800), then at step 672, the LHA 130 is operated to determine from the domain identifier 141 including in said message a category of delegated addresses from an RHA 120 in the determined domain of the domain identifier that may be assigned to said third node 140. Next, at step 673, the LHA 120 checks to see if there is at least one unassigned address in said determined category. If there is at least one unassigned address in said determined category, then operation proceeds to step 674. In step 674 an assignment constraint that is associated with said determined category is determined, and then, in step 676, the properties of the third node 140, which are optionally included in the assignment request message, are compared to the determined assignment constraints. In step 677, operation proceeds based on whether or not an address assignment constraint is satisfied. Next, if an address assignment constraint is satisfied in step 677, then operation proceeds to step 678. In step 678, the LHA 130 is operated to assign a determined previously unassigned address to the third node 140, to determine the first downstream interface towards the third node 140 and then to store the third node 140 identity, the assigned address and the location of the third node 140 in the LHA 130, to associate that state with the VPN forwarding entry between the determined downstream interface and the VPN coupling 150 towards the RHA 120 from which the now assigned address was delegated. This VPN forwarding entry is then activated for forwarding of packets with a source address that is associated with the RHA 120, that arrive on the downstream interface. Next, in step 680, the LHA 130 is operated to transmit an address assignment response message, e.g., message 900, towards the third node 140, indicating said assigned address, said address assignment response message further optionally including the information that associates packets including the source address of the third node 140 with the RHA 120. This information can be a multiplexing identifier, an interface link-layer or IP address at the LHA such as the first downstream interface identifier, a virtual circuit identifier at the LHA or a combination of similar such identifiers. The method then returns to step 550 (node B) to await further messages.

Returning to step 673, if there is not at least one unassigned address in said determined category, then operation proceeds to step 675. Returning to step 677, if the address assignment constraint is not satisfied, then processing again moves to step 675. In either case, step 675 determines whether the RHA supports address delegation triggered by an address assignment failure. If the RHA 120 does support triggered delegation then, in step 693, the LHA 130 is operated to send an address delegation request message to the RHA 120, indicating the nature of the assignment failure so that one or more appropriate addresses may be delegated. However, if the RHA 120 does not support triggered delegation then, in step 679, the LHA 130 is operated to respond to the third node 140 with an assignment refusal, and the LHA 130 is optionally operated to send an address delegation information update message, e.g., message 1100, to RHA 120. The RHA 120 can then choose to delegate additional addresses at some future time to the LHA 130, of the required category and matching the indicated constraints. The method then returns to step 550 (node B) to await further messages.

Returning to step 670, if the message is alternatively determined to be a redirected data packet (e.g., a tunneled packet from the access node 124 to the LHA 130, e.g., message 1400) including a data packet from the third node 140 (e.g., with a source address that includes the assigned address that was delegated from the RHA 120 to the LHA 130) (event 681), then at step 682, the LHA 130 is operated to determine the upstream VPN interface that is associated with the VPN coupling 150, from information included in the received redirected data packet that associates the data packet with the RHA 120, said information optionally including a multiplexing identifier. The upstream VPN identifier is contained in the VPN forwarding entry that is associated with the RHA 120. Next, in step 684, the LHA 130 is operated to determine a forwarding check to be performed on the said received data packet from stored information associated with the determined VPN forwarding entry. Next, if a forwarding check is to be performed, then in step 686, the LHA 130 is operated to perform a forwarding check that is one of a check: that the source address of the data packet has a source address that was delegated from the second node (RHA) 120, that that source address has been assigned by the LHA 130, and that the redirected packet has been received from the correct location (e.g. such as one of the correct FA CoA or MN CCoA in the redirected packet source address, and a GPS coordinate), said location being correct if it matches the location stored for the assigned address in the LHA 130. Next, in step 688, it is determined whether the forwarding check of step 686 is successful. If the forwarding check is successful, operation proceeds from step 688 to step 690, where the LHA 130 is operated to forward the data packet, e.g., message 1300, that was included in the received redirected data packet, e.g., message 1400, and recovered, for example, by a tunnel decapsulation process, to the determined upstream VPN interface of the VPN coupling 150 towards the RHA 120 that delegated the source address of the data packet to the LHA 130, e.g., in message 1500. If the forwarding check was not successful, operation proceeds from step 688 to step 692. In step 692, the data packet is discarded. The method then moves from either step 690 or step 692 to step 550 (node B) where the LHA 130 awaits further messages.

Figure 7:
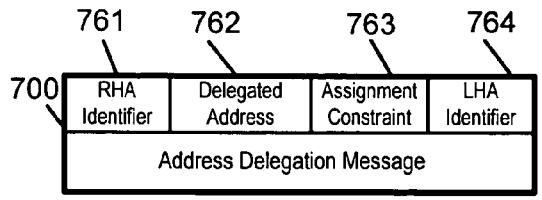
FIG. 7 is an illustration of an exemplary address delegation message in accordance with the present invention.

FIG. 7 illustrates an exemplary address delegation message 700 in accordance with the present invention. Message 700 may be an exemplary representation of message 161 of FIG. 1. Exemplary address delegation message 700 includes message parts 761, 762, 763, and 764. Message part 761 includes the RHA identifier such as the source IP address of message at the RHA whilst message part 764 includes the LHA identifier such as the destination address of packets towards the LHA. Message part 762 includes an address that is being delegated to the LHA and message part 763 optionally includes an assignment constraint associated with the delegated address, such as the address category or a service class.

Figure 8:
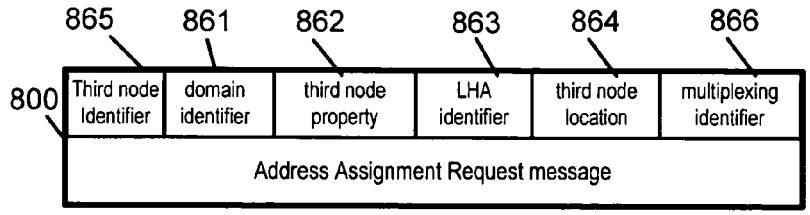
FIG. 8 is an illustration of an exemplary address assignment request message, in accordance with the present invention.

FIG. 8 illustrates an exemplary address assignment request message 800 in accordance with the present invention. Message 800 may be an exemplary representation of message 163 of FIG. 1. Exemplary address assignment request message 800 includes message parts 865, 861, 862, 863, 864, and 866. Message part 865 includes an identifier for the third node 140 such as the source address of packets from the third node 140, whilst message part 863 includes a LHA identifier such as the destination address of packets towards the LHA. Message part 861 includes a domain identifier 141 of the third node 140 that is used to associate the third node 140 with the second addressing domain 102, or even a specific RHA, e.g. RHA 120, in that domain 102. Message part 862 includes an optional property of the third node 140 that is used to guide address assignment, and which for example could be an address category or a claimed service class. Message part 864 includes an optional third node location which for example could be the FA CoA, the CCoA or even one or more GPS coordinates used to track movement of the third node 140. Message part 866 includes an optional multiplexing identifier that is communicated to the LHA and which should be included in redirected data packets so that the LHA can associate packets containing the assigned address with the RHA that delegated that address to the LHA.

Figure 9:
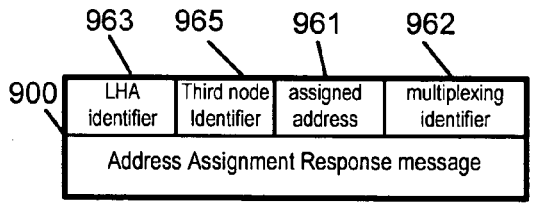
FIG. 9 is an illustration of an exemplary address assignment response message, in accordance with the present invention.

FIG. 9 shows an exemplary address assignment response message 900 in accordance with the present invention. Message 900 may be an exemplary representation of message 164 of FIG. 1. Exemplary address assignment response message 900 includes message parts 963, 965, 961, and 962. Message part 963 includes an LHA identifier such as the source address of packets from the LHA, whilst message part 965 includes a third node identifier such as the destination address of packets towards the third node 140. Message part 961 includes an assigned address whilst part 962 includes an optional multiplexing identifier from the LHA that should be included in redirected packets towards the LHA so that the redirected packet can be associated with the VPN forwarding entry towards the RHA that delegated the assigned address in part 961 to the LHA. If the multiplexing identifier 962 is absent, then the LHA identifier in part 963 is used to identify the VPN forwarding entry at the LHA.

Figure 10:
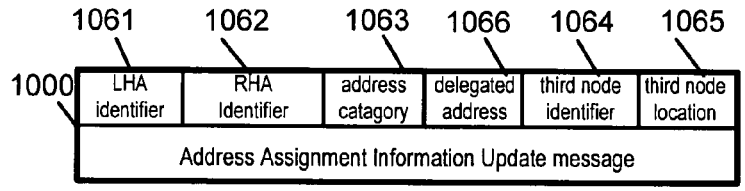
FIG. 10 is an illustration of an exemplary address assignment information update message, in accordance with the present invention.

FIG. 10 illustrates an exemplary address assignment information update message 1000 in accordance with the present invention. Message 1000 may be an exemplary representation of message 160 of FIG. 1. Exemplary address assignment information update message 1000 includes message parts 1061, 1062, 1063, 1066, 1064, and 1065. Message part 1061 includes an LHA identifier which for example can be the source address of packets from the LHA, and message part 1062 includes an RHA identifier such as the destination address of packets towards the RHA. Message part 1066 includes a value of the delegated address with which the information update message is associated, and message part 1063 optionally includes a delegated address category. Message part 1064 includes a third node identifier that has been assigned the delegated address whilst message part 1065 optionally includes the location of the third node 140.

Figure 11:
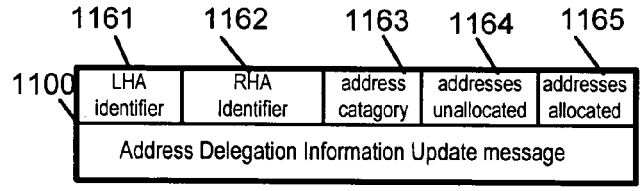
FIG. 11 is an illustration of an exemplary address delegation information update message, in accordance with the present invention.

FIG. 11 illustrates an exemplary address delegation information update message 1100 in accordance with the present invention. Message 1100 may be an exemplary representation of message 162 of FIG. 1. Message 1100 includes message parts 1161, 1162, 1163, 1164, and 1165. Message part 1161 includes a LHA identifier which for example can be the source address of packets from the LHA, and message part 1162 includes a RHA identifier such as the destination address of packets towards the RHA. Message part 1163 optionally includes a category of addresses referred to by this message. Message part 1164 indicates the number of unallocated addresses at the LHA that are in the category of part 1163 and which have been delegated by the RHA. Message part 1165 alternatively indicates the number of allocated addresses at the LHA that are in the category of part 1163 and which have been delegated by the RHA. If message part 1163 is not included, then the address delegation information update message 1100 is associated with each of the addresses that have been delegated from the RHA to the LHA.

Figure 12:
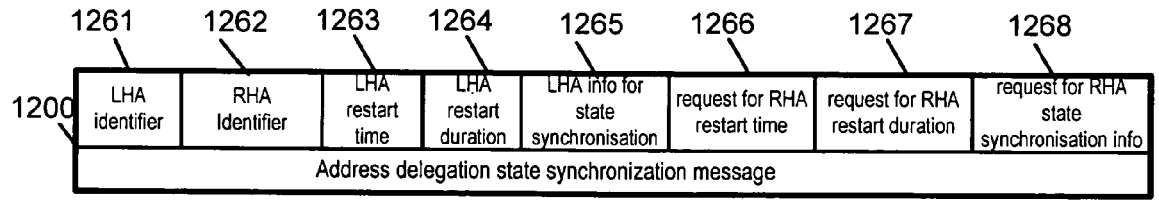
FIG. 12 is an illustration of an exemplary address delegation state synchronization message, in accordance with the present invention.

FIG. 12 illustrates an exemplary address delegation state synchronization message 1200 in accordance with the present invention. Message 1200 may be an exemplary representation of message 169 of FIG. 1. Exemplary address delegation state synchronization message 1200 includes message parts 1261, 1262, 1263, 1264, 1265, 1266, 1267, and 1268. Message part 1261 includes a LHA identifier which for example can be the source address of packets from the LHA, and message part 1262 includes a RHA identifier such as the destination address of packets towards the RHA. Message part 1263 indicates a restart time of the LHA whilst part 1264 additionally or alternatively indicates a duration since the last restart at the LHA. Message parts 1263 and/or 1264 are used at the RHA to determine if the LHA has restarted since the last state synchronization message. Message part 1265 includes summary information to be used for state synchronization between the LHA and the RHA, for the state at the LHA. This summary information can be compared to synchronization state at the RHA associated with the LHA to identify when state is no longer synchronized, so that erroneous LHA state can be repaired. Message parts 1266, 1267 and 1268 are used by the LHA to request equivalent information from the RHA for the RHA restart time, restart duration and RHA synchronization state for the RHA state respectively. When returned to the LHA, this information can be used to detect a restart of the RHA and to determine when the LHA and RHA have different synchronization state for the RHA state so that erroneous state can be repaired.

The messages of FIGS. 7 through 12 can further include aggregated information that pertains to multiple delegated addresses, multiple address categories, multiple assigned addresses, multiple end nodes such as the third node 140, multiple multiplexing identifiers, multiple end node locations, multiple address constraints and/or multiple synchronization state entries. This aggregation of information may be useful to reduce the total amount of messages between the third node 140, LHA, e.g., first node 130, and RHA, e.g., second node 120.

Whilst the invention has been described in terms of redirection of a data packet using a tunnel encapsulation between either the MN 140 or the access node 124 and the first node 130, it will be clear to those skilled in the art that packet redirection can be accomplished by using additional headers such as destination and routing headers in IPv6 (Internet Protocol version 6) and by using link-layer identifiers such as in MPLS (MultiProtocol Label Switching) or ATM (Asynchronous Transfer Mode). In addition, the invention has been described in terms of multiple new messages although the features of those messages can be provided by extensions to existing messages such as extensions to RSVP (Resource Reservation Protocol) and MPLS traffic engineering messages, and extensions to Mobile IP mobility messages.

Messages may be stored in a physical machine readable medium such as a hard disk, memory or other storage device as a collection of bits located as a unit in said machine readable medium. Fields within said messages may be stored as adjacent sets of bits in the storage medium. Messages generated and communicated in accordance with the invention are stored, e.g., temporarily, in buffers and/or other memory implemented as a physical machine readable medium used to store the message. Software modules may also be stored in the physical machine readable memory.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method for use in a communications system including first and second addressing domains, a first set of addresses corresponding to the first addressing domain, a second set of addresses corresponding to the second addressing domain, the first addressing domain including a first node, said first node including a plurality of interfaces, said second addressing domain including a second node, a virtual private network (VPN) coupling said first and second nodes, an upstream VPN interface identifier that identifies an interface at said first node through which packets to be communicated over said VPN are forwarded to the second node, the method comprising:

operating the first node to receive from said second node address delegation information indicating at least one delegated address from said second set of addresses which said first node can assign;

operating the first node, in response to receiving said address delegation information from the second node, to install a forwarding entry, said forwarding entry associating a first node downstream interface with the first node upstream interface identified by said upstream VPN interface identifier; and operating the first node to receive a first packet including a source address having the value of the delegated address and information associating the source address with the second node, said first node selecting as a function of said information associating the source address with the second node which one of a plurality of forwarding entries to use in determining an upstream VPN interface to be used to forward said received first packet.

2. The method of claim 1, further comprising:

operating the first node to receive a second packet including a source address having the value of the delegated address and information associating the source address with another node that is different to the second node, said first node selecting a different one of the plurality of forwarding entries to use in determining an upstream VPN interface to be used to forward said received second packet to said another node.

3. The method of claim 1, further including:

operating the first node to forward the first packet received over the first downstream interface over the upstream VPN interface determined using the selected forwarding entry.

4. The method of claim 1, wherein the second packet is received over a second downstream interface, said first or second downstream interface being determined by information included with a received packet, said information including network identifiers including one of: an MPLS (Multi Protocol Label Switching) label, a virtual circuit identifier, a frame source address and a frame destination address, the method further comprising:

operating said first node to determine from said information included with a received packet a subset of forwarding entries at the first node associated with the second domain.

5. The communications method of claim 1, wherein said communication system further includes a third node located in said first address domain, the third node being coupled to said first node, the method further comprising:

operating the third node to transmit an address assignment request message to said first node, said address assignment request message including a second domain identifier, said address assignment request message requesting assignment of an address corresponding to said second domain; and operating the first node to send an address delegation request message to the second domain in response to the reception of the address assignment request message.

6. The communications method of claim 5, wherein said address assignment request message further includes address assignment property information indicating a property of the third node, said property information including one of: authentication information for the purpose of authenticating the third node to the first or second node, the service class of the third node indicating the services provided to the third node, an address category indicator selecting between subsets of addresses such as public, private IPv4 and IPv6 addresses.

7. The communications method of claim 6, wherein said first node includes in said address delegation request message constraint information obtained from said address assignment request message, said constraint information indicating a property of the third node, the method further comprising:
  operating the second node to determine if the property of the third node indicated in said address delegation request message satisfies an address delegation constraint.

8. The communications method of claim 7, wherein said second node declines to delegate an address when the second node determines an address delegation constraint is not satisfied.

9. The communications method of claim 1, wherein said system further includes a third node in said first domain coupled to said first node, the method further comprising:
  operating said first node to receive an address assignment request message from said third node, said address assignment request message including a second domain identifier which identifies said second domain;
  operating the first node to identify an unassigned delegated address corresponding to said second domain identifier; and
  operating the first node to assign the identified address corresponding to said second domain identifier to said third node in an address assignment message.

10. The communication method of claim 9, further comprising:
  operating the first node to transmit an address assignment information update message to said second node that includes update information about a delegated address, said update message further including assignment information about the third node that has been assigned said delegated address, said information including one of a third node identifier used to identify the third node to the second domain, information indicating a topological location of the third node in the first domain, and information indicating a geographical location of the third node in the first domain.

11. The communication method of claim 1, further comprising:
  operating the first node to transmit an address delegation state synchronization message to said second node including at least one of: the time that the first node last restarted, the amount of time that has elapsed since the first node last restarted, address delegation state synchronization information at the first node, a request for the second node to report the time that the second node last restarted, a request for the second node to report, to the first node, information indicating the amount of time that has elapsed since the second node last restarted, and a request for the second node to report the address delegation state synchronization information at the second node.

12. The method of claim 1, wherein the selected forwarding entry associated with the first received packet further indicates that the source address of a received packet arriving on the first downstream interface is to be checked against the list of delegated addresses from the second node, the method further comprising:
  operating the first node to drop a received packet when a source address in the received packet is different from any of the addresses included in the list of delegated addresses from the second node.

13. The communications method of claim 1, wherein said communication system further includes a third node located in said first address domain, the third node being coupled to said first node, the method further comprising:
  operating the first node to drop a received packet including the delegated address when said address is unassigned to said third node.

14. The method of claim 1, wherein said communication system further includes a third node located in said first address domain, the third node being coupled to said first node, wherein the third node has a topological location in the first domain, said topological location being identified by an address assigned by an access node to which the third node is coupled, and wherein said forwarding entry includes the topological location of the third node that has been assigned said delegated address, the method further comprising:
  operating the first node to receive a packet including a source address having the value of the delegated address and information associating the source address with the second node, the received packet further including the topological location of the packet originator; and
  operating the first node to drop said received packet if the location in the received packet is different from that included in said forwarding entry.

15. The method of claim 1, wherein there is a predetermined relationship between the information in a received packet associating the source address of the received packet with the second node, and a value used as said upstream VPN interface identifier for forwarding to the second node.

16. The method of claim 1, wherein said communication system further includes a third node located in said first address domain, the third node being coupled to said first node, the method further including:
  operating the first node to assign to said third node an address delegated from the second node; and
  operating the first node to transmit an address assignment response message to the third node including said assigned address and said information that associates the source address of said packet with the second node.

17. The method of claim 1, wherein said information that associates the source address of said packet with the second node is a multiplexing identifier used to distinguish a packet associated with the second node within an aggregate of IP packets being received at the first node.

18. The method of claim 1, wherein said information that associates the source address of said packet with the second node is a multiplexing identifier used to distinguish a packet associated with a specific address category at the second node within an aggregate of IP packets being received at the first node.

19. The method of claim 1, wherein said information that associates the source address of said packet with the second node is a destination address of the received packet that is an address of the first node that is used only in packets to be directed to the second node.

20. The communications method of claim 1, further comprising:
  operating the first node to transmit to said second node an address delegation request message requesting delegation of at least one address included in said second set of addresses, said second node transmitting said address delegation information message in response to reception of said address delegation request message.

21. The communications method of claim 20, wherein said system further includes a third node in said first domain coupled to said first node, said third node storing information on a property of the third node, the method further comprising:
  operating said first node to include in said address delegation request message, constraint information indicating a constraint that is associated with a property of said third node, said constraint being required by said first node to be satisfied before said first node assigns the address to the third node, said address being delegated in response to said address delegation request message.

22. The method of claim 21, wherein the constraint information includes one of: an identifier for the third node that was allocated by the second domain, authentication information for the purpose of authenticating the third node to the second node, the service class of the third node indicating the services provided to the third node.

23. The method of claim 21, wherein the constraint information includes one of: an address category indicator that identifies a sub-set of addresses at the second node and the topological location of the first node in the first domain, said topological location being an address assigned to the third node by an access node to which the third node is coupled.

24. The communication method of claim 1, further comprising:
operating the first node to transmit a delegated address information update message to said second node, said update message including information on the status of the delegated addresses at the first node, said information including one of: a number indicating the total unallocated second domain addresses which were delegated to said first node, a number indicating the total unallocated second domain addresses which were delegated to said first node by said second node, a number indicating the total allocated second domain addresses which were delegated to said first node, and a number indicating the total allocated second domain addresses which were delegated to said first node by said second node.

25. The communications method of claim 1, wherein said communication system further includes a third node located in said first address domain, the third node being coupled to said first node, wherein said address delegation information received from said second node indicates address assignment constraint information which is to be satisfied when said first node assigns an address indicated in said address delegation information to the third node.

26. The method of claim 25, wherein the constraint information includes one of: an identifier for the third node that was allocated, by the second domain, the service class of the third node indicating the services provided to the third node, an address category indicator identifying specific subsets of addresses delegated to the first node by the second node, and the topological location of the first node in the first domain.

27. The communication method of claim 25, further comprising:
operating the first node to transmit a delegated address information update message to said second node, said update message including information on the status of the delegated addresses at the first node, said information including: a number of allocated second domain addresses. which are subject to a particular address allocation constraint and a number of unallocated second domain addresses which are subject to a particular address allocation constraint.

28. A communications system comprising:
a first addressing domain and a second addressing domain, a first set of addresses corresponding to the first addressing domain, a second set of addresses corresponding to the second addressing domain, the first addressing domain including a first node, said first node including a plurality of interfaces, said second addressing domain including a second node, a virtual private network (VPN) coupling said first and second nodes, an upstream VPN interface identifier that identifies an interface at said first node through which packets to be communicated over said VPN are forwarded to the second node;
wherein the first node includes:
means for receiving from said second node address delegation information indicating at least one delegated address from said second set of addresses which said first node can assign;
means for, in response to receiving said address delegation information from the second node, installing a forwarding entry, said forwarding entry associating a first node downstream interface with the first node upstream interface identified by said upstream VPN interface identifier;
means for receiving a first packet including a source address having the value of the delegated address and information associating the source address with the second node; and
means for selecting as a function of said information associating the source address with the second node which one of a plurality of forwarding entries to use in determining anupstream VPN interface to be used to forward said received first packet.

29. A computer readable medium embodying machine executable instructions for controlling a communications device to implement a method in a communication system, the communication system including first and second addressing domains, a first set of addresses corresponding to the first addressing domain, a second set of addresses corresponding to the second addressing domain, the first addressing domain including a first node, said first node including a plurality of interfaces, said second addressing domain including a second node, a Virtual Private Network coupling said first and second nodes, an upstream virtual private network (VPN) interface identifier that identifies an interface at said first node through which packets to be communicated over said VPN are forwarded to the second node, the method comprising:
operating the first node to receive from said second node address delegation information indicating at least one delegated address from said second set of addresses which said first node can assign;
operating the first node, in response to receiving said address delegation information from the second node, to install a forwarding entry, said forwarding entry associating a first node downstream interface with the first node upstream interface identified by said upstream VPN interface identifier; and
operating the first node to receive a first packet including a source address having the value of the delegated address and information associating the source address with the second node, said first node selecting as a function of said information associating the source address with the second node which one of a plurality of forwarding entries to use in determining an upstream VPN interface to be used to forward said received first packet.

30. The computer readable medium of claim 29, wherein the method further comprises:
operating the first node to receive a second packet including a source address having the value of the delegated address and information associating the source address with another node that is different to the second node, said first node selecting a different one of the plurality of forwarding entries to use in determining an upstream VPN interface to be used to forward said received second packet to said another node.

31. The computer readable medium of claim 29, wherein the method further comprises:
   operating the first node to forward the first packet received over the first downstream interface over the upstream VPN interface determined using the selected forwarding entry.

32. A processor configured to control a communications device to implement a method in a communication system, the communication system including first and second addressing domains, a first set of addresses corresponding to the first addressing domain, a second set of addresses corresponding to the second addressing domain, the first addressing domain including a first node, said first node including a plurality of interfaces, said second addressing domain including a second node, a virtual private network (VPN) coupling said first and second nodes, an upstream VPN interface identifier that identifies an interface at said first node through which packets to be communicated over said VPN are forwarded to the second node, the method comprising:
   operating the first node to receive from said second node address delegation information indicating at least one delegated address from said second set of addresses which said first node can assign;
   operating the first node, in response to receiving said address delegation information from the second node, to install a forwarding entry, said forwarding entry associating a first node downstream interface with the first node upstream interface identified by said upstream VPN interface identifier; and
   operating the first node to receive a first packet including a source address having the value of the delegated address and information associating the source address with the second node, said first node selecting as a function of said information associating the source address with the second node which one of a plurality of forwarding entries to use in determining an upstream VPN interface to be used to forward said received first packet.

33. A first node for use in a communications system including a first addressing domain and a second addressing domain, a first set of addresses corresponding to the first addressing domain, a second set of addresses corresponding to the second addressing domain, the first addressing domain including said first node, said first node including a plurality of interfaces, said second addressing domain including a second node, a virtual private network coupling said first and second nodes, an upstream Virtual Private Network (VPN) interface identifier that identifies an interface at said first node through which packets to be communicated over said VPN are forwarded to the second node, the first node comprising:
   an address delegation module for processing address delegation information received from said second node, address delegation information indicating at least one delegated address from said second set of addresses which said first node can assign;
   a management module for managing a forwarding entry, said forwarding entry associating a first node downstream interface with the first node upstream interface identified by said upstream VPN interface identifier;
   an input interface for receiving a first packet including a source address having the value of the delegated address and information associating the source address with the second node; and
   a forwarding module for selecting as a function of said information associating the source address with the second node which one of a plurality of forwarding entries to use in determining an upstream VPN interface to be used to forward said received first packet.

* * * * *